(12) United States Patent
Diehl et al.

(10) Patent No.: US 11,842,583 B2
(45) Date of Patent: Dec. 12, 2023

(54) SYSTEM AND METHOD FOR DETERMINING VEHICLE NAVIGATION IN RESPONSE TO BROKEN OR UNCALIBRATED SENSORS

(71) Applicant: Pony AI Inc., Grand Cayman (KY)

(72) Inventors: Peter G. Diehl, Shanghai (CN); Siddharth Mohan Ram, Oakland, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 17/856,888

(22) Filed: Jul. 1, 2022

(65) Prior Publication Data

US 2022/0335756 A1 Oct. 20, 2022

Related U.S. Application Data

(63) Continuation of application No. 16/560,938, filed on Sep. 4, 2019, now Pat. No. 11,380,147.

(51) Int. Cl.
*G07C 5/08* (2006.01)
*G05D 1/00* (2006.01)
*G05D 1/02* (2020.01)

(52) U.S. Cl.
CPC ......... *G07C 5/0808* (2013.01); *G05D 1/0055* (2013.01); *G05D 1/0231* (2013.01); *G05D 2201/0213* (2013.01)

(58) Field of Classification Search
CPC .. G07C 5/0808; G05D 1/0055; G05D 1/0231; G05D 2201/0213; B60W 2756/10; B60W 50/023; B60W 50/029; B60W 60/00186; B60W 50/0205; B60W 2050/0215; G01S 13/931; G01C 25/00; G01C 25/005
See application file for complete search history.

(56) References Cited

U.S. PATENT DOCUMENTS

| | | | |
|---|---|---|---|
| 6,577,334 B1 | 6/2003 | Kawai et al. | |
| 8,046,166 B2 | 10/2011 | Cabral et al. | |
| 8,300,886 B2 | 10/2012 | Hoffmann | |
| 9,412,273 B2 | 8/2016 | Ricci | |
| 11,380,147 B2 | 7/2022 | Diehl et al. | |
| 2016/0288799 A1* | 10/2016 | Nguyen Van | B60W 30/09 |
| 2019/0197797 A1 | 6/2019 | Na | |
| 2021/0035279 A1 | 2/2021 | Hu et al. | |

* cited by examiner

*Primary Examiner* — Michael V Kerrigan
(74) *Attorney, Agent, or Firm* — Sheppard Mullin Richter & Hampton LLP

(57) ABSTRACT

Provided herein is a system and method for providing a vehicle navigation in response to broken or uncalibrated vehicle sensors. The system comprises a sensor to capture data, one or more processors, and a memory storing instructions that cause the system to determine whether the sensor is broken or uncalibrated based on the data, and to limit a range of motion of the vehicle when the sensor is determined to be broken or uncalibrated. The limiting a range of motion of the vehicle includes limiting a number of driving options for the vehicle when the sensor is broken.

20 Claims, 9 Drawing Sheets

SYSTEM AND METHOD FOR DETERMINING VEHICLE NAVIGATION IN RESPONSE TO BROKEN OR UNCALIBRATED SENSORS

CROSS REFERENCE TO RELATED APPLICATIONS

This application is a continuation of U.S. application Ser. No. 16/560,938, filed Sep. 4, 2019.

TECHNICAL FIELD

The present disclosure relates generally to vehicles equipped with sensor damage detection system useful for driving assistance or autonomous driving, and in particular, some embodiments relate to vehicle navigation in response to broken or uncalibrated sensors.

BACKGROUND

On-board sensors in vehicles, such as autonomous vehicles (AVs), supplement and bolster the vehicle's field of vision by providing accurate sensor data. Sensor data is used, for example, in applications of blind spot detection, lane change assisting, read end radar for collision warning or collision avoidance, park assisting, cross-traffic monitoring, brake assisting, emergency braking, and/or automatic distance controlling. Examples of on-board sensors include, for example, passive sensors and active sensors. On-board sensors include camera, Lidar, radar, GPS, sonar, ultrasonic, IMU (inertial measurement unit), accelerometers, gyroscopes, magnetometers, and FIR (far infrared) sensors. Sensor data may include image data, reflected laser data, and/or the like. Often, images captured by the on-board sensors utilize a coordinate system to determine the distance and angle of the contents and objects captured in the image. Such real-time space information may be acquired near the vehicle using various on-board sensors located throughout the vehicle, which may then be processed to calculate and to determine the safe driving operation of the vehicle. On-board sensors may be subject to spectral distribution, ambient light, specular reflections, and other optical phenomena. Sensors may also not be able to capture data and may be broken or uncalibrated. If left uncalibrated, the accuracy of information obtained from the sensors may be compromised. If the sensor is determined to be broken, the vehicle may be unsafe to operate. Therefore, it is imperative that the vehicle is capable of detecting uncalibrated or damaged sensors on the vehicle, and undergoing preventive measures to avoid danger, accident, or catastrophe in an event of an uncalibrated or broken sensor.

Currently, as an example, calibration panels are installed in select areas (e.g., garage) to calibrate the on-board sensors. However, not every uncalibrated sensor can be recalibrated by the calibration panels. Additionally, the calibration panels cannot fix broken sensors. As a result, the on-board sensors may be uncalibrated or broken for a period of time, thereby causing a concern of safety of vehicle navigation for a vehicle such as an AV. For example, if the sensor is uncalibrated, the vehicle may not be able to capture all the data from the field of view captured by the sensor. The shortfalls are addressed by the present disclosures, which provides the vehicle with capability to not only detect broken or uncalibrated sensors, but also preventive measures when a sensor is broken or uncalibrated, including limiting a range of motions of the vehicle (e.g., a limited number of driving options), restricting the vehicle from using the broken or uncalibrated sensors, and allowing the vehicle to execute a safe driving action.

SUMMARY

Described herein are methods and systems for determining whether sensors, such as sensors disposed on a side of a vehicle, are broken or uncalibrated, determining whether the an uncalibrated sensor can be calibrated, determining that the uncalibrated sensor is broken if the uncalibrated sensor cannot be calibrated, and limiting a range of motion of the vehicle when the side sensor is determined to be broken or uncalibrated. Various embodiments of the present disclosure provide a vehicle system comprising a sensor configured to capture data, one or more processors, and a memory storing instructions. The memory storing instructions, when executed by the one or more processors, may cause the system to perform determining whether the sensor is broken or uncalibrated, based on the data, and limiting a range of motion of the vehicle when the sensor is broken or uncalibrated.

In some embodiments, the limiting the range of motion may comprise limiting a number of driving options for the vehicle when the sensor is determined to be broken or uncalibrated.

In some embodiments, the limiting the range of motion comprises, in response to the sensor being broken or uncalibrated, restricting the vehicle from making a turn beyond a threshold radius of curvature or angle in a direction corresponding to a side of the broken sensor. The threshold radius of curvature or angle is determined based on an extent of damage or miscalibration of the sensor based on an extent of damage of the sensor.

In some embodiments, the instructions further cause the system to perform, in response to determining that the sensor is broken or uncalibrated, obtaining missing data from another vehicle, and in response to obtaining the missing data from the another vehicle, restoring a range of motion of the vehicle.

In some embodiments, the determining whether the sensor is broken or uncalibrated comprises: determining a current parameter of the sensor from the data and a previous parameter of the sensor from historical data; determining a difference between the current parameter and the previous parameter; and determining, in response to the difference exceeding a threshold, that the sensor is broken or uncalibrated.

In some embodiments, the data comprises an image or one or more features extracted from the image at a specific location, and the historical data comprises a second image or one or more features extracted from the second image at the specific location.

In some embodiments, the sensor is located at a first side of the vehicle, and the limiting the range of motion comprises, in response to the difference exceeding the threshold, preventing the vehicle from turning in a direction of the first side.

In some embodiments, the system comprises a working sensor configured to receive second data, and wherein the determining whether the sensor is broken or uncalibrated comprises: determining a parameter of the working sensor from the second data; determining whether the sensor is broken or uncalibrated based on a difference between a parameter of the sensor and the parameter of the working sensor; and in response to the difference exceeding a threshold, determining that the sensor is broken or uncalibrated.

In some embodiments, the limiting the range of motion of the vehicle comprises: limiting, in response to the difference between the parameter of the sensor and the parameter of the second sensor exceeding the threshold, the range of motion of the vehicle to a number of driving options; and restricting the vehicle from turning in a direction of the first side.

In some embodiments, the data comprises an image or one or more features extracted from the image at a specific location, and the second data comprises a second image or one or more second features from the second image at the specific location.

In some embodiments, the image or one or more features extracted from the image at the specific location include images of a traffic light at a traffic intersection, a stationary object at a traffic intersection, a pedestrian, and/or a vehicle.

In some embodiments, the determining whether the sensor is broken or uncalibrated comprises: determining that the sensor is broken in response to the sensor not being able to capture the data, and wherein the limiting the range of motion of the vehicle comprises restricting the vehicle from moving in a direction of a field of view captured by the sensor.

In some embodiments, the determining whether the sensor is broken or uncalibrated comprises: determining whether the sensor can be calibrated based on a working sensor; in response to determining that the sensor can be calibrated, determining that the sensor is uncalibrated and calibrating the sensor; in response to determining that the sensor cannot be calibrated, determining that the sensor is broken; and in response to determining that the sensor is broken, restricting the vehicle from moving in a direction of a field of view captured by the sensor.

In some embodiments, the limiting the range of motion of the vehicle comprises: determining an amount of the range of motion by which the vehicle is restricted based on a speed of the vehicle, a traffic density, a road condition, or a weather condition.

In some embodiments, the limiting the range of motion of the vehicle comprises: determining an amount of the range by which the vehicle is restricted based on a whether the sensor is broken.

Various embodiments of the present disclosure provide a method of determining a safe driving action of a vehicle, comprising capturing data from a sensor, transmitting the data to a sensor damage detector, determining, using the sensor damage detector, whether the sensor is broken or uncalibrated; in response to determining that the sensor is broken or uncalibrated, transmitting information to an error handler that the sensor is broken or uncalibrated; and limiting, using the error handler, a range of motion of the vehicle.

In some embodiments, the capturing the data from the sensor comprises: capturing the data from the sensor located at a first side of the vehicle; and the limiting the range of motion of the vehicle comprises limiting the range of motion of the vehicle to a number of driving options of the vehicle.

In some embodiments, the determining whether the sensor is broken or uncalibrated comprises: determining a current parameter of the sensor from the data and a previous parameter of the sensor from historical data; determining a difference between the current parameter and the previous parameter; and determining, in response to the difference exceeding a threshold, that the sensor is broken or uncalibrated.

In some embodiments, the method further comprises: capturing second data from a working sensor; determining a parameter of the sensor from the data and a parameter of the working sensor from the second data; determining a difference between the parameter of the sensor from the data and the parameter of the working sensor from the second data; and determining, in response to the difference exceeding a threshold, that the sensor is broken or uncalibrated.

In some embodiments, the data comprises an image or one or more features extracted from the image at a specific location, and the second data comprises a second image or one or more features extracted from the second image at the specific location.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Various embodiments of the present disclosure provide systems and methods for a sensor damage detection system and an error handling system mounted on vehicles. First, a sensor damage detection system detects whether a sensor is damaged (e.g., broken) or uncalibrated. Next, in various implementations, the error handling system may determine driving actions based on whether a sensor is damaged or uncalibrated. In some examples, a sensor damage detector provides instructions regarding driving actions to be undertaken or allowable. The sensor damage detector may determine whether a sensor, for example, a side sensor mounted on a vehicle, is broken or uncalibrated. For example, if the sensor damage detector determines that the sensor is uncalibrated and can be calibrated, the error handling system may execute recalibration of the sensor system. As another example, if the sensor damage detector determines that the sensor is broken and cannot be calibrated, the error handling system may be instructed to execute particular driving options. The error handling system may, in response to a broken sensor, limit a range of motion of the vehicle. Specifically, the error handling system may provide a number of driving options or restrict the vehicle from turning in a direction of the side with the broken sensor. For example, if a vehicle has a broken sensor on a left side, the error handling system may restrict the vehicle from turning in a left direction or changing a lane to the left. The error handling system may also limit a number of driving options in response to the broken side sensor and its surrounding road conditions.

Figure 1:
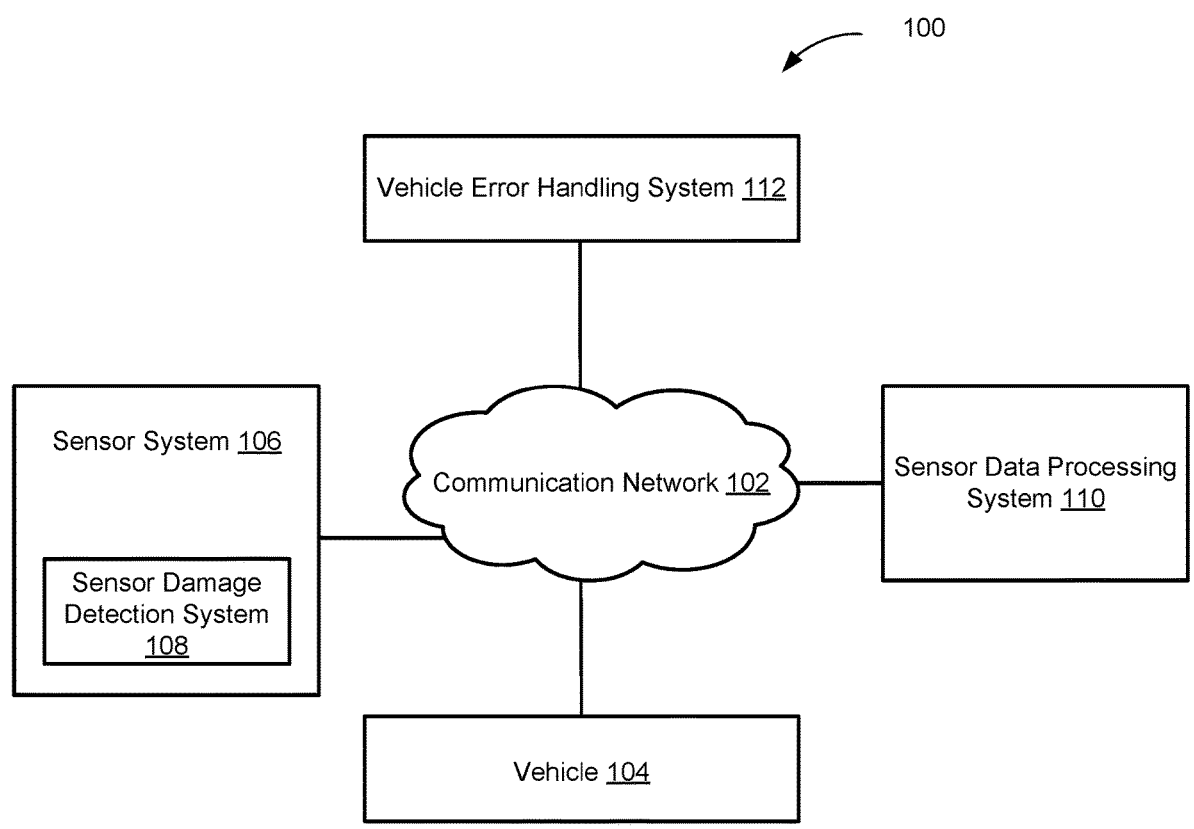
FIG. 1 depicts a diagram of an example system for a vehicle sensor system, in accordance with some embodiments.

In the example illustrated in FIG. 1, the vehicle system 100 may include a vehicle 104, a sensor system 106, a sensor data processing system 110, a vehicle error handling system 112, and a communication network 102. In some embodiments, the systems 106, 110, 112 and the communication network 102 may be implemented as part of the vehicle 104. In some embodiments, the vehicle sensor system 106 may include a sensor damage detection system 108. The vehicle discussed herein may include vehicles that travel in the air (e.g., drones, helicopter, airplanes, and so on), travels on water (e.g., a boat), and/or the like. The vehicle discussed herein may accommodate one or more passengers therein.

In some embodiments, the sensor system may be mounted on one or more portions. The sensor system may be mounted on one or more portions (e.g., exterior surfaces, interior surfaces) of a vehicle, and may include a sensor, or one or more sensors. As used herein, sensors may include laser scanning systems (e.g., Lidar systems), radar systems, cameras, GPS, sonar, ultrasonic, IMU, and FIR (far infrared) sensors and/or the like. The sensor system may be configured to capture sensor data, for example, data from a left sensor (on a left side of the vehicle) and a right sensor (on a right side of the vehicle). The sensor data may be captured from different side sensors (left sensor and right sensor) at a same time, or sequential times. The sensor data may be captured by a same sensor at different, sequential times. Sequential may mean directly before or directly afterwards. The different sensors may be sensors of a same or a different modality. The sensor data may include an image captured from the one or more sensors, or one or more specific features (such as trees, road, grass, landmarks, people, inanimate objects) extracted from the image. The sensor data may be further processed to obtain or estimate one or more current parameters, and the like. The sensor data may be further processed to obtain an image histogram of a graphical representation of tonal distribution in an image. The one or more parameters may include information of the sensor that may be compared with known, previous parameters from manufacturer specifications. Such parameters may include information generated from a statistical analysis of the data. Such parameters may include an optical center, a focal length, a skew, a distortion, an image center, a depth of field, an angle of view, a beam angle, an aspect ratio, and a pixel number, a level of noise, and the like.

The sensor system 106 may analyze and/or process the sensor data. For example, the sensor system 106 may determine or estimate a parameter from the sensor data (e.g., via processing of the sensor data) and compare the parameter to a known parameter. For example, the sensor system 106 may be configured to process the sensor data into an image histogram of a graphical representation of tonal distribution in an image captured by the one or more sensors. In some embodiments, the known parameter is from manufacturer specifications or obtained after processing of historical data.

In some embodiments, the sensor system 106 may include the sensor damage detection system 108. The sensor damage detection system 108 may periodically determine whether the sensor or the one or more sensors is uncalibrated or broken. For example, the sensor damage detection system 108 may check calibration at fixed periods and/or following abnormal occurrences such as a bump or pothole in a road, which for example may be detected by an IMU. The sensor system 106 may determine a difference between the determined or estimated parameter and the known parameter. Specifically, the sensor damage detector may determine whether the sensor is broken or uncalibrated based on the difference between the determined or estimated parameter and the known parameter. If the difference between the determined or estimated parameter and the known parameter exceeds a threshold (e.g., a first threshold), a sensor damage detector in the sensor damage detection system 108 may determine that the sensor from which the sensor data originated is broken and needs to be calibrated. For example, the sensor damage detector may be configured to process the sensor data to determine a smoothness of the generated image histogram as mentioned above. If the smoothness of the image histogram deviates from a smoothness of a reference histogram by more than a threshold (e.g., a first threshold), then the sensor damage detector may determine that the sensor is uncalibrated or broken. As another example, if an amount of noise in the sensor data exceeds a threshold, the sensor damage detection system 108 may determine that the sensor is uncalibrated.

In some embodiments, the sensor damage detection system 108 may determine, in response to the difference between the determined or estimated parameter and the known parameter exceeding the first threshold, that the sensor is uncalibrated but can be calibrated or that the sensor is uncalibrated and broken. In some embodiments, if the calibration of the uncalibrated sensor is not successfully executed, the error handling system 112 may limit a range of motion of the vehicles, providing a limited driving options for the vehicle based on the broken sensor.

In some embodiments, the error handling system 112 may be a module. In some embodiments, the error handling system 112 may address an uncalibrated sensor by selecting from one of initiating a backup sensor and recalibrating the sensor. In some embodiments, the error handling system 112 may select from one of eliminating data determined to be erroneous from the sensor, issuing an alert to a user, initiating a backup sensor, and recalibrating the sensor. In some embodiments, the error handling system 112 may select from any combination of: eliminating data determined to be erroneous from the sensor, issuing an alert to a user, initiating a backup sensor, and recalibrating the sensor. In some embodiments, the error handling system 112 may be configured to eliminate data determined to be erroneous. In some embodiments, the error handling system 112 may be configured to eliminate only data determined to be erroneous while retaining the correct data. For example, if only a portion of an image is determined to be erroneous, the error handling system 112 may eliminate only the portion determined to be erroneous while retaining the remainder of the image. In some embodiments, the error handling system 112 may be configured to initiate a backup sensor to operate, for example, until the uncalibrated sensor is successfully recalibrated. In some embodiments, the error handling system 112 may be configured to initiate a backup sensor if a backup sensor is available, rather than recalibrating the sensor. In some embodiments, the error handling system 112 may be configured to initiate a backup sensor if a backup sensor is available and if the backup sensor is calibrated. In some embodiments, the backup sensor is of a same modality as the uncalibrated sensor. In some embodiments, the backup sensor is of a different modality as the uncalibrated sensor. In some embodiments, the error handling system 112 may be configured to recalibrate the sensor. For example, the error handling system 112 may be configured to recalibrate the sensor based on a landmark such as a feature on a road, a traffic sign, or a traffic light. In some embodiments, the error handling system 112 may be configured to issue an alert of an uncalibrated sensor or potentially uncalibrated sensor.

In some embodiments, if the sensor is determined to be broken and cannot be calibrated, or if attempted calibration is unsuccessful, the error handling system 112 may limit a range of motion of the vehicle. In some embodiments, the error handling system 112 may selecting one of limiting a number of driving options for the vehicle, and restricting the vehicle from turning in a direction of the side with the broken sensor. In some embodiments, the error handling system 112 may be configured to instruct other sensors in the vehicle system 100 to provide driving options for the vehicle such that the vehicle may avoid using the broken sensor. For example, if the sensor at a first side is determined to be broken by the sensor damage detection system 108, the error handling system 112 may restrict the vehicle from turning in a direction of the first side, thereby avoiding the use of the broken sensor at the first side.

In some embodiments, the error handling system 112 may use an error handling method or combination of methods that consumes a minimum system load on the error handling system 112, the sensor system 106, or the overall system. In some embodiments, the error handling system 112 may be configured to select an error handling method or methods based on a load consumption of the method or methods, an amount of availability of a system load, a history of the sensor, an availability of a backup sensor, a density of moving objects detected at a current location, a weather condition at the current location, or an environment condition at the current location. In some embodiments, the error handling system 112 may be configured to select an error handling method based on the one or more results of previous error handling of the sensor, for example, stored in memory. For example, the selecting an error handling method may be based on a method that has a highest rate of success for that particular sensor or a sensor of that modality. As another example, the selecting an error handling method may be based on a method that has a highest increasing rate of success or a lowest decreasing rate of success for that particular sensor or a sensor of that modality. For example, the error handling method selected may be a method that has shown a best trend of success rate, such as, for example, the method that has shown a rate of success that has decreased less than other methods, or a rate of success that has increased more than other methods. In some embodiments, the selection of the error handling method or methods by the error handling system 112 may be based on any combination of the aforementioned factors. In some embodiments, if previous rate of success of recalibration is greater than a threshold (e.g. a third threshold), the error handling system 112 may choose recalibration as the method. In some embodiments, if previous rate of success of recalibration is lower than a threshold (e.g. the third threshold), the error handling system 112 may not choose recalibration as the error handling method but instead chooses to limit a range of motion of the vehicle (e.g. by limiting a number of driving options) as the error handling method. In some embodiments, a previous rate of success of recalibration is measured based on or relative to a specific location, landmark, or type of landmark (e.g., traffic sign, light). For example, if a previous rate of success of recalibration specifically at a traffic light is lower than a threshold (e.g. a fourth threshold), the error handling system 112 may not choose recalibration as the error handling method.

In some embodiments, the error handling system 112 may be configured to determine whether to perform a recalibration in response to the sensor damage detector determining that the sensor is uncalibrated. In some embodiments, the error handling system 112 may be configured to determine whether to perform the recalibration based on an amount of an error or a frequency of an error occurrence in the sensor. For example, if an amount of an error is greater than a threshold (e.g. a fifth threshold), and/or a frequency of an error occurrence is greater than a threshold (e.g. a sixth threshold), the error handling system 112 may determine that recalibration is to be performed on the sensor. In some embodiments, the error handling system 112 may be configured to determine whether to perform the recalibration based on a combination of an amount of error and a frequency of an error occurrence, or one of an amount of error and a frequency of an error occurrence. In some embodiments, the error handling system 112 may be configured to determine that the sensor cannot be calibrated. For example, if an amount of an error is greater than a threshold (e.g. the fifth threshold), the error handling system 112 may determine that the sensor cannot be calibrated, and thereby limiting driving options in response to the broken sensor. An amount of an error may be determined by the sensor system 106 and measured by, for example, an angular offset, a hinge angle offset, bias error, scale factor, error, non-linearity, noise, misalignment, offset, or laser offset, or any combination thereof, or the like.

In response to the error handling system 112 determining that a recalibration is to be performed, the error handling system 112 may further determine a mode or type of recalibration method required (e.g., one-point calibration, two-point calibration, multi point curve fitting). For example, the error handling system 112 may further determine a type of recalibration method required based on the sensor data (e.g., type of sensor error, such as offset, sensitivity or slope, linearity). For example, the error handling system 112 may be configured to determine a mode of recalibration to be performed on the sensor based on an amount of an error, a frequency of an error, or a history of the sensor. For example, the error handling system 112 may determine that a full recalibration is to be performed if an amount of error, frequency or error, or history (e.g., age) of the sensor, or any combination of the following, exceed(s) respective thresholds. The error handling system 112 may determine that only a partial recalibration is to be performed if an amount of error, frequency or error, or age of the sensor, or any combination of the following, do or does not exceed(s) respective thresholds. A partial recalibration may occur when the sensor is recalibrated by an amount less than that required to fully recalibrate the sensor. For example, if the sensor requires a ten degree correction to be fully calibrated, a partial recalibration may only recalibrate the sensor by five degrees. The error handling system 112 may further determine a mode of recalibration based on a load consumed by the error handling system 112, the sensor system 106, and/or the overall system 100.

In some embodiments, in response to the sensor being determined to be uncalibrated, the error handling system 112 may further determine whether to immediately limit a range of motion of the vehicle. For example, the error handling system 112 may determine that the sensor should be determined to be broken and immediately limit the range of motion of the vehicle if no backup sensor and/or redundant sensor is available, or if conditions (e.g. traffic, environment, road condition) are especially dangerous.

In some embodiments, the error handling system 112 may immediately limit a range of motion of the vehicle if recalibration attempts are unsuccessful (e.g., the sensor is not validated after recalibration). In some embodiments, the error handling system 112 may limit a number of driving options for the vehicle in response to the location of the broken sensors (i.e., broken sensors are sensors that cannot be recalibrated). In some embodiments, the error handling system 112 may also determine driving actions in response to the environment (e.g., speed of the vehicle, traffic density, road conditions or weather conditions). For example, if no data is captured from other working sensors of the vehicle system, the error handling system 112 may determine that there are no other objects (e.g. pedestrian, buildings, vehicles) surrounding the vehicle, or that the density of other objects is low, and if the vehicle is going to turn to a direction of the side with the broken sensor, the error handling system 112 may limit a speed of the vehicle when making the turn, instead of entirely restricting the vehicle from turning in a direction of the side with the broken sensor. If the error handling system 112 determines that there are other objects surrounding the vehicle (i.e., high density of traffic), in response to the broken sensor, the error handling system 112 may restrict the vehicle from turning in a direction of the side with the broken sensor.

In some embodiments, the error handling system 112 is implemented as one or more programmable boards (e.g., programmable circuit boards) that are disposed logically and/or physically between the sensor system 106 and the sensor data processing system 110. For example, there may be one or more separate programmable boards for each type of sensor (e.g., a programmable board to filter camera sensor data, a programmable board to filter laser scanning system sensor data, a programmable board to filter ultrasonic sensor data, and/or the like), or there may be a single programmable board for all sensors.

The sensor data processing system 110 may function to process sensor data to sense an environment surrounding a vehicle and/or cause a vehicle to perform one or more vehicle driving actions such as autonomous driving actions (or, simply, "driving actions"). For example, the sensor data processing system 110 may process data captured at different times or from different sensor modalities to make the data compatible or suitable for comparison. In some embodiments, the sensor data processing system 110 may analyze sensor data to identify objects (e.g., traffic signals, road signs, other vehicles, pedestrians, and obstacles) in one or more regions surrounding the vehicle. The sensor data processing system 110 may process the historical data and/or the sensor data to separate any boundaries (such as between natural objects, for example, grass and road, sky and mountain, sky and ground). As used herein, driving actions may include controlling braking, acceleration, and/or steering without real time human input. Furthermore, as used herein, "real time human input" is intended to represent a human input that is needed to concurrently control wheel movement of a non-self-driving vehicle, such as gear shifting, steering control, braking pedal control, acceleration pedal control, crutch pedal control, and so on. The sensor data processing system 110 may be implemented as a central computing system of an autonomous vehicle.

In some embodiments, the sensor data processing system 110 may include filtering functionality. In various embodiments, the sensor data processing system 110 may not include filtering functionality. This may allow, for example, the sensor data processing system 110 to be implemented using less powerful components (e.g., slower processors, less memory, and/or the like), and still achieve all of the functionality of a vehicle such as an AV. In various embodiments, the filtering functionality is provided separately (not shown).

The communications network 102 may represent one or more computer networks (e.g., LAN, WAN, bus, or the like) or other transmission mediums. The communication network 102 may provide communication between the vehicle 104, systems 106-110 and/or other systems/engines described herein. In some embodiments, the communication network 102 may include one or more computing devices, routers, cables, buses, and/or other network topologies (e.g., mesh, and the like). In some embodiments, the communication network 102 may be wired and/or wireless. In various embodiments, the communication network 102 may include the Internet, one or more wide area networks (WANs) or local area networks (LANs), one or more networks that may be public, private, IP-based, non-IP based, and so forth.

Figure 2:
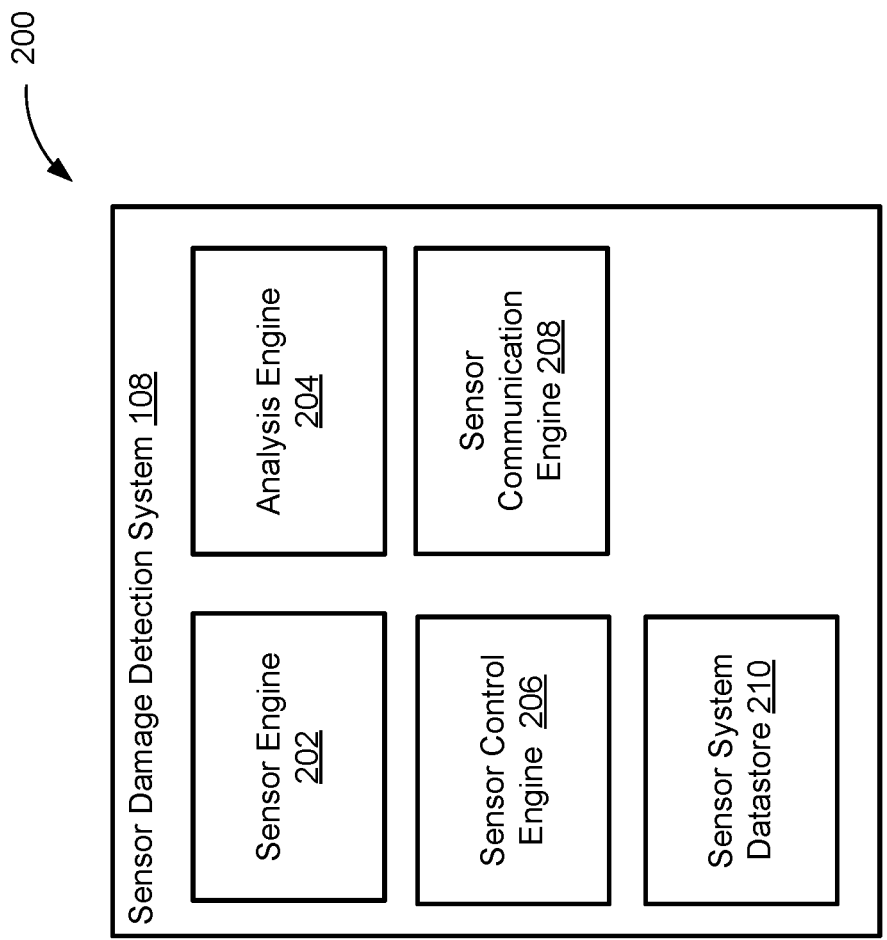
FIG. 2 depicts a diagram of an example of a sensor damage detection system according to some embodiments, in accordance with some embodiments.

FIG. 2 depicts a diagram 200 of an example of a sensor damage detection system 108 in accordance with some embodiments. In the example of FIG. 2, the sensor damage detection system 108 may include a sensor engine 202, an analysis engine 204, a sensor control engine 206, a sensor communication engine 208, and a sensor system datastore 210.

The sensor engine 202 may function to capture sensor data (e.g., data) in one or more regions surrounding a vehicle. The sensor engine 202 may include one or more sensors. For example, the sensor may include a sensor at a left side, and a sensor at a right side. The sensors may include laser scanning systems (e.g., Lidar systems), radar systems, cameras, GPS, sonar, ultrasonic, IMU, and FIR (far infrared) sensors and/or the like.

In some embodiments, the sensors may include a rotatable laser scanning system. The rotatable laser scanning system may include a laser, scanner and optics, photodetector and receiver electronics, and position and navigation systems. The rotatable laser scanning system may project light (e.g., pulsed laser light) on regions surrounding a vehicle such as an autonomous vehicle (e.g., an autonomous vehicle the rotatable laser scanning system is mounted on), and measure the reflected pulses. The reflected pulses may be used to generate representations (e.g., 3D representations) of the regions surrounding the autonomous vehicle. The rotatable laser scanning system may rotate 360 degrees in order to capture sensor data for the regions surrounding the vehicle such as the autonomous vehicle.

In some embodiments, cameras may be mounted on the vehicle such as an AV to capture images (or, image data) of regions surrounding the vehicle. For example, the cameras may capture images in front of the vehicle, on the sides of the vehicle, above the vehicle, below the vehicle, and/or behind the vehicle.

The analysis engine 204 (e.g., a sensor damage detector) may to determine whether a sensor of the one or more sensors is broken or uncalibrated. In some examples, the analysis engine 204 may determine that a sensor is broken or uncalibrated by validating data captured from one of the sensors. In some examples, the validating the data may be based on a parameter of the sensor or be based on previously known data such as historical data of the parameter of the sensor.

In some embodiments, the data may be processed and analyzed to be converted into, for example, an image histogram of a graphical representation of tonal distribution in an image captured by the sensor. In some embodiments, the data may be processed and analyzed to determine or estimate a parameter of the sensor. The parameter may include information of the sensor that may be compared with a known parameter from manufacturer specifications. The parameter may be indicative of Lidar point number distribution or camera pixel diversity and locality. The known parameter may have been obtained as a result of being processed or analyzed from historical data. In some embodiments, the parameter may include an optical center, a focal length, a skew, a distortion, an image center, a depth of field, an angle of view, a beam angle, an aspect ratio, and a pixel number, a level of noise, and the like. In some embodiments, the data may include an image captured from the sensor, or one or more specific features (such as trees, road grass, landmark, person, inanimate object) extracted from the image.

Historical data may refer to, as an example, an image, or one or more specific features of the image. The image (e.g., of the historical data) may be captured at a specific location, for example, taken at a same location as the data. Historical data may be information already verified to be accurate. Historical data may be images from other sensors and/or onboard 3D map data.

In some embodiments, the analysis engine 204 conducts the validation based on the known parameter. For example, the analysis engine 204 may be configured to determine or estimate a parameter from the data (e.g., via processing of the data) and compare the determined or estimated parameter to a known parameter. For example, the analysis engine 204 may be configured to process the data into an image histogram of a graphical representation of tonal distribution in an image captured by the sensor.

In some embodiments, the analysis engine 204 determines a difference between the determined or estimated parameter and the known parameter. If the difference between the determined or estimated parameter and the known parameter exceeds a first threshold, the analysis engine 204 determines that the sensor from which the data originated is broken (i.e. uncalibrated and cannot be recalibrated). In some embodiments, if the difference between the determined or estimated parameter and the known parameter is below a second threshold, the analysis engine 204 determines that the sensor is not to be calibrated. In some embodiments, if the difference between the determined or estimated parameter and the known parameter exceeds a second threshold but is less than a first threshold, the analysis engine 204 may determine that further validation is desired to determine whether the sensor can be recalibrated.

The sensor may be validated based on previously stored historical data. As an example, how closely the data matches with the historical data is a basis for determining whether the sensor is to be calibrated. As an example, how closely the data matches with the historical data may be based on a proportion of features present in the historical data that are also in common with one or more features extracted from the data, or, of the features that are in common between the historical data and the data, how closely each of the features matches (e.g. a degree of similarity between each of the features).

In some embodiments, the analysis engine 204 may be configured to determine a proportion of the one or more features of the historical data that matches the one or more features of the data, and determine whether the proportion is less than a third threshold. For example, the analysis engine 204 may determine whether one or more common feature(s) (such as a tree, monument, road, grass, landmark, person, inanimate object) is present in both the data and the historical data. If the proportion is less than a third threshold, the analysis engine 204 may determine that further validation is desired before determining whether the sensor is to be calibrated. In some embodiments, the analysis engine 204 may determine that the sensor is to be calibrated. In some embodiments, in addition or in place of determining whether the proportion is less than the third threshold, the analysis engine 204 may test on the basis of individual features of the historical data. In some embodiments, if the proportion is larger than the third threshold, the analysis engine 204 may limit the range of motion of the vehicle. For example, of the features of the historical data that matches the one or more features of the data, the analysis engine 204 may select one, some, or all of the aforementioned matching features, and determine how closely each of the selected feature(s) matches between the historical data and the data (e.g. a degree of similarity between each of the features). If each of the selected feature(s) matches sufficiently between the historical data and the data, the analysis engine 204 may determine that the sensor does not require calibration, or is not to be calibrated. If some or all of the selected features(s) does not sufficiently match between the historical data and the data, the analysis engine 204 may determine that further validation is desired to determine whether the sensor is broken or can be recalibrated. For example, if one, some, or all of the features of the historical data exhibits a similarity with the data of greater than a fourth threshold, the analysis engine 204 may determine that no calibration is needed. In some embodiments, if the similarity is less than a fifth threshold, the analysis engine 204 may determine that calibration is to be done, or that further testing may be desired to determine whether the sensor can be recalibrated. In some embodiments, if the similarity is between a fourth and fifth threshold, the analysis engine 204 may determine that further testing may be desired.

For example, if historical data includes a feature (e.g., a building) that is not present in the data, the discrepancy may be a result of the sensor being uncalibrated, or the sensor may be calibrated but the building is no longer present. In such scenario, further testing may be desired to determine whether the sensor is to be, or should be calibrated. For example, further testing may be done on the basis of second data taken at a different time and/or by a different sensor.

In some embodiments, the analysis engine 204 may obtain information resulting from further processing of the historical data and/or the data to determine whether any boundaries are present (such as between natural objects, for example, grass and road, sky and mountain). In some embodiments, one or more of the boundaries between the historical data and the data may be analyzed for similarities and differences. In some embodiments, if one, some, or all of the boundaries between the historical data and the data have a similarity exceeding a third threshold, the analysis engine 204 may determine that calibration on the sensor is not to be conducted. In some embodiments, if one, some, or all of the boundaries between the historical data and the data have a similarity lower than a fourth threshold, the analysis engine 204 may determine that calibration on the sensor is to be conducted, or that further validation is desired to determine whether calibration on the sensor is to be conducted.

In some embodiments, the analysis engine 204 may compare relative sizes of the one or more features of the historical data with relative sizes of the one or more features of the data. In some embodiments, the analysis engine 204 may compare a relative spacing between the one or more features of the historical data with a relative spacing between the one or more features of the data. If such discrepancies are present between the historical data and the data, the analysis engine 204 may determine that whether calibration of the sensor should be conducted, whether the sensor is broken, or that further validation of the sensor is desired.

In some embodiments, the analysis engine 204 may compare an orientation of the data with an orientation of the historical data. For example, if the data is upside down or rotated relative to the historical data, the analysis engine 204 may determine the sensor is uncalibrated or that further validation of the sensor is desired. If, after the recalibration of the sensor, the result of the data is unchanged (e.g. data remains upside down or rotated relative to the historical data), the analysis engine 204 may determine that the sensor is broken and cannot be recalibrated.

In some embodiments, the analysis engine 204 may alternatively, or in addition to conducting the validation on the basis of the known parameter or the historical data, validate the sensor based on a continuous or sequential series of images or frames obtained by the sensor. The sensor may be a camera or Lidar, for example. The sensor may also be radar, GPS, sonar, ultrasonic, IMU, and FIR (far infrared) and/or the like.

For example, the analysis engine 204 may determine whether a feature on the series of images is determined to be continuously increasing in size in a smooth manner as the vehicle moves towards the feature, or is determined to be continuously decreasing in size in a smooth manner as the vehicle moves away from the feature. If the feature is not determined to be changing in size appropriately as the vehicle is moving, the analysis engine 204 may determine that calibration of the sensor is to be, or should be conducted or that further validation of the sensor is desired. For example, if a feature disappears or appears abruptly, the analysis engine 204 may determine that calibration of the sensor is to be, or should be conducted or that further validation of the sensor is desired. Thus, the analysis engine 204 may measure a rate at which the feature disappears or appears and compare the rate to a reference value, in order to determine whether calibration of the sensor should be conducted, whether the sensor is broken, or whether further validation of the sensor is desired.

In some embodiments, the analysis engine 204 may adjust the known parameter by a compensation factor based on a time of day, an amount of ambient light, or an environment condition. For example, the analysis engine 204 may adjust the known parameter to account for the fact that the vehicle is operating at nighttime, while the known parameter may have been taken during the daytime. In some embodiments, the analysis engine 204 may refer to a lookup table of the known parameter or a lookup table of the historical data. The lookup table may be stored in memory (e.g., sensor system datastore 210). The lookup table may comprise values of the known parameter or images of the historical data based on different times of day, different amounts of ambient light, or an environment condition (e.g., levels of fog, levels of smog, humidity, precipitation, snow). The lookup table may comprise values of the known parameter or images of the historical data based on a combination of time of day, amount of ambient light, or other environment conditions. For example, the lookup table may comprise images of the historical data taken at each hour of the day. As another example, the lookup table may comprise values of the known parameter based on a level of ambient light at a location (e.g., tunnel, direct sunlight). In some embodiments, the analysis engine 204 may select a corresponding entry from the lookup table that is closest to the data. The analysis engine 204 may use the selected entry as a basis to determine whether the sensor is to be calibrated. For example, if the entry is a parameter, the analysis engine 204 may compare the entry to the determined or estimated parameter from the data. If the entry is historical data (e.g., image), the analysis engine 204 may analyze the entry and the data to determine whether the sensor is to be calibrated.

In some embodiments, the analysis engine 204 may determine further validation is desired, and for the further validation, select either the validation or a second validation, the selection being based on a comparison of a computation load requirement of the validation and a computation load requirement of the second validation. For example, the second validation may be based on a second data captured at a different time or from a second sensor. For example, the analysis engine 204 may select either the validation or the second validation, whichever validation requires a minimum computation load. In some embodiments, the analysis engine 204 may conduct the validation based on the known parameter. The analysis engine 204 may then determine that further validation is desired, and select from the validation and the second validation. The analysis engine 204 may determine whether the historical data is stored in a memory (e.g., sensor system datastore 210). If the analysis engine 204 determines that the historical data of the data is stored in the memory, the analysis engine 204 may select the validation over the second validation. In some embodiments, if the analysis engine 204 determines that the historical data of the data is not stored in the memory, the analysis engine 204 may select the second validation over the validation. In some embodiments, if the analysis engine 204 determines that the historical data of the data is not stored in the memory, the analysis engine 204 may upload map data (e.g., 3D map data) onto the analysis engine, to use as a basis for the further validation. The map data may be at a same location as the data. In some embodiments, the analysis engine 204 may determine whether uploading and comparing the map data requires or consumes more computation load compared to using the second validation. If the uploading and comparing the map data requires or consumes more computation load than other validation methods, then the analysis engine 204 may not upload the map data. If the uploading and comparing the map data does not require or consume more computation load than the other validation methods, then the analysis engine 204 may upload the map data, and use the map data in place of the historical data as a basis for the further validation.

In some embodiments, if the analysis engine 204 determines that further validation is desired or that the sensor is broken, the analysis engine 204 may determine whether calibrating the sensor requires or consumes less resource load compared to the total resource load (e.g., computation load) required or consumed by the further validation. If the sensor is determined to be broken or cannot be recalibrated, the analysis engine 204 may inform the error handling module (e.g., 112) that a limited range of motion of the vehicle is required, via the communication network 102, instead of conducting the further validation or recalibration. In other words, the analysis engine 204 may select the most energy efficient option.

In some embodiments, the analysis engine 204 may be configured to determine whether the sensor is to be calibrated based on only the validation or based on the validation and further validations, such as the second validation. For example, the determining may be based on the known parameter, then further validation based on the historical data, and additional further validation based on the second validation. In some embodiments, the analysis engine 204 may conduct any series of the validation and the second validation in parallel or sequentially. The analysis engine 204 may conduct the validation and the second validation in any combination and in any sequential order. For example, the analysis engine 204 may conduct the validation, then conduct the second validation, and lastly conduct the validation. As another example, the analysis engine 204 may conduct the validation and the second validation simultaneously, then conduct the validation alone. In some embodiments, the analysis engine 204 may conduct the validation or the second validation only if it is determined to be desired.

In some embodiments, if the analysis engine 204 conducts a second validation, the data and the second data may be captured from different sensors at a same time, a same sensor at different, sequential times, or different sensors at different, sequential times. If the data and the second data are captured at different times, one of the data and the second data may be processed, for example, by the sensor data processing system 108 to make the data and the second data suitable for comparison, or to make it possible to determine differences or similarities between the data and the second data, or between portions of the data and the second data. For example, the second data may be reoriented to match the data if it is taken by a different sensor and/or at a different time. In some embodiments, the different sensors may be sensors of a same or a different modality. If the different sensors are of different modality, for example, Lidar and camera, or GPS and camera, the data or the second data may be processed by the sensor data processing system 110 so that data from different modalities can be appropriately compared. In some embodiments, the second data is captured during the determining process, and not already stored as historical data or as a known parameter. For example, the second data may be captured subsequent to the generation of the data. As another example, the second data may be captured immediately prior to the generation of the data. In some embodiments, if the sensor is determined not to require calibration, the data captured from the sensor at the time of the determination is stored as historical data, for example, in memory such as the sensor system datastore 210. In some embodiments, if the sensor is determined not to require calibration, the data (e.g., image or feature of the image) captured from the sensor is stored in a lookup table (e.g., in the sensor system datastore 210).

The analysis engine 204 may be further configured to adjust a frequency of the validation or the second validation based on a computation load requirement or consumption of the validation or the second validation, an amount of availability of a computation load of the sensor system 104, a history of the sensor, a density of moving objects detected, a weather condition, or an environment condition. For example, if a computation load requirement or consumption of the validation or the second validation is high, the analysis engine 204 may conduct the validation or the second validation less frequently. As another example, if there are not enough resources available on the sensor system 106 to be able to conduct the first or the second validation, the analysis engine 204 may adjust the frequency of the validation or the second validation so that they are conducted less frequently. As another example, if the sensor is old or frequently requires calibration, the analysis engine 204 may conduct the validation or the second validation more frequently. As another example, if the density of moving objects (e.g., people, vehicles) detected is high, which signifies a higher danger, the analysis engine 204 may conduct the validation or the second validation more frequently. As another example, if the weather conditions are rainy or snowy, signifying a higher danger, the analysis engine 204 may conduct the validation or the second validation more frequently. As another example, if the environment conditions are foggy, hazy, or polluted, signifying a higher danger, the analysis engine 204 may conduct the validation or the second validation more frequently.

In some embodiments, if a computation load requirement or consumption of the validation or the second validation is high, or if the sensor cannot be recalibrated and data cannot be validated, the analysis engine 204 may immediately notify an error handling system to limit driving options for the vehicle. For example, if the density of moving objects surrounding a broken or uncalibrated sensor is high, which signifies a higher danger, the analysis engine 204 may immediately notify the error handling system to restrict the vehicle from using the broken sensor or may immediately shut down the vehicle. As another example, if the weather conditions are rainy or snowy, signifying a higher danger, the analysis engine 204 may immediately notify the error handling system to restrict the vehicle from using the broken sensor or may immediately shut down the vehicle.

The analysis engine 204 may be configured to adjust the frequency of the validation or the second validation based on at least one of, or any combination of, the computation load requirement of the validation or the second validation, the amount of availability of a computation load of the sensor system 104, the history of the sensor, the density of moving objects detected, a weather condition, and an environment condition. For example, the analysis engine 204 may be configured to adjust the frequency of the validation and the frequency of the second validation based on the same factors, or based on different factors. For example, the analysis engine 204 may be configured to adjust the frequency of the validation based on the history of the sensor and based on the computation load requirement of the validation. For example, the analysis engine 204 may be configured to adjust the frequency of the validation based on the history of the sensor and based on the computation load requirement of the validation, while adjusting the frequency of the second validation based on the density of moving objects detected, the weather condition, or the environment condition.

The sensor control engine 206 may function to control the sensor engine 202. More specifically, the sensor control engine 206 may function to control the one or more sensors of the sensor engine 202, and/or components thereof. In some embodiments, the sensor control engine 206 may control a rotatable laser scanner system to selectively capture sensor data. Similarly, the sensor control engine 206 may function to not capture certain sensor data. For example, the cameras may be powered off, controlled to not capture images, controlled to delete and/or not store captured images, and/or the like. In some embodiments, the control engine may control the sensor damage detection system to not capture certain sensor data if the sensor is determined to be broken by the analysis engine. In some embodiments, the control engine may function to capture certain images from the sensor if the analysis engine determines that the sensor is uncalibrated but can be recalibrated based on the images.

The sensor communication engine 208 may function to send requests, transmit and, receive communications, and/or otherwise provide communication with one or a plurality of systems. In some embodiments, the sensor communication engine 208 may function to encrypt and decrypt communications. The sensor communication engine 208 may function to send requests to and receive data from one or more systems through a network or a portion of a network. Depending upon implementation-specified considerations, the sensor communication engine 208 may send requests and receive data through a connection, all or a portion of which may be a wireless connection. The sensor communication engine 208 may request and receive messages, and/or other communications from associated systems.

Communications may be stored at least temporarily (e.g., cached and/or persistently) in the sensor system datastore 210. For example, the lookup table may be stored in the sensor system datastore 210. As another example, the historical data, historical data, the known parameters, and/or thresholds (e.g., first threshold, second threshold, third threshold, fourth threshold) may be stored in the sensor system datastore 210. In some embodiments, the sensor system datastore 210 may be a memory.

Figure 3:
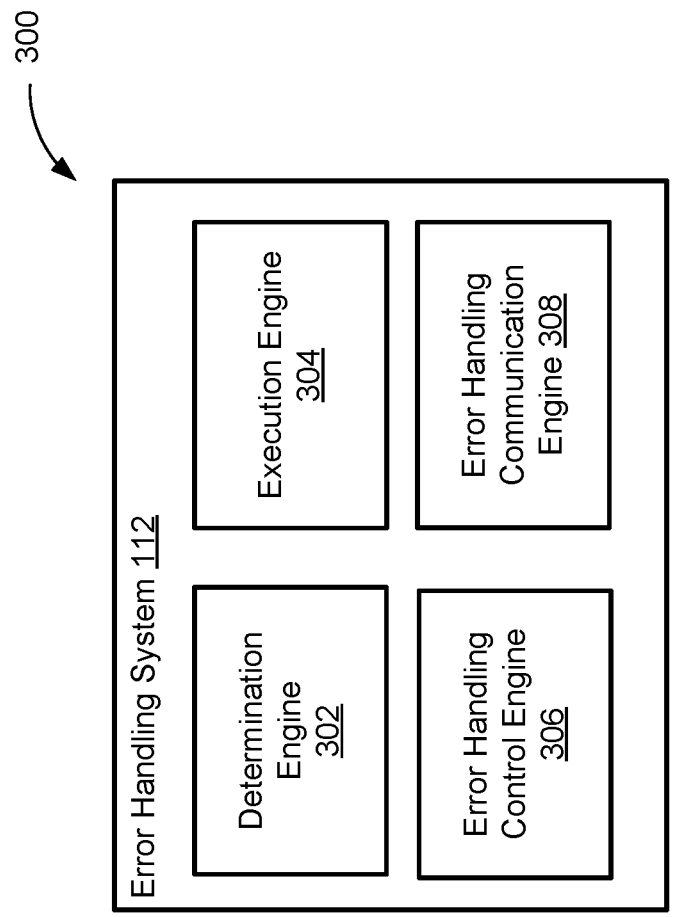
FIG. 3 depicts a diagram of an example of an error handling system according to some embodiments, in accordance with some embodiments.

FIG. 3 illustrates a diagram 300 of an example of an error handling system 112 in accordance with some embodiments. In the example of FIG. 3, the error handling system 112 may include a determination engine 302, an execution engine 304, an error handling control engine 306, and an error handling communication engine 308.

The determination engine 302 may function to determine which error handling method or sequence of methods to perform. The determination engine 302 may select an error handling method or combination of methods that consumes a minimum system load on the error handling system 112, the sensor system 106, or the overall system. In some embodiments, the determination engine 302 may select an error handling method or methods based on a load consumption of the method or methods, an amount of availability of a system load, a history of the sensor, an availability of a backup sensor, a density of moving objects detected at a current location, a weather condition at the current location, or an environment condition at the current location. In some embodiments, the determination engine 302 may select an error handling method based on the one or more results of previous error handling methods of the sensor, for example, stored in memory. The one or more results of previous error handling methods of the sensor may comprise a lookup table. The determination engine 302 may select an error handling method based on a method that has a highest rate of success for that particular sensor or a sensor of that modality. As another example, the determination engine 302 may select an error handling method based on a method that has a highest increasing rate of success or a lowest decreasing rate of success for that particular sensor or a sensor of that modality. For example, the determination engine 302 may select an error handling method that has a best trend of success rate, such as, for example, the method that has a rate of success that has decreased less than other methods, or a rate of success that has increased more than other methods. In some embodiments, the determination engine 302 may select the error handling method or methods based on any combination of the aforementioned factors. In some embodiments, if previous rate of success of recalibration is greater than a threshold (e.g. a fifth threshold), the determination engine 302 chooses recalibration as the error handling method. In some embodiments, if previous rate of success of recalibration is lower than a threshold (e.g. a fifth threshold), the determination engine 302 does not choose recalibration as the error handling method but instead chooses instructing a limited number of driving options for vehicles to avoid using the broken sensor as the error handling method. In some embodiments, a previous rate of success of recalibration is measured at a specific location, landmark, or type of landmark (e.g., traffic sign, light). For example, if a previous rate of success of recalibration specifically at a traffic light is lower than a threshold (e.g. a fifth threshold), the error handling system 106 does not choose recalibration as the error handling method, and instead chooses to limit a range of motions of vehicle at the specific locations or landmarks.

In some embodiments, in response to the sensor being determined to be uncalibrated, the determination engine 302 further determines whether the sensor requires immediate recalibration. For example, the sensor may require immediate recalibration if the determination engine determines that the uncalibrated sensor can be recalibrated. As another example, if the determination engine 302 determines that the sensor cannot be recalibrated, the determination engine 302 may send a message to execution engine 304 to execute a limited number of driving options for the vehicles. In some embodiments, if the broken sensor cannot be recalibrated, the determination engine may wait to notify the execution engine 304 to limit the driving options for the vehicle when a required load on the error handling system 112, the sensor system 106, or the overall system would be lower than a current required load. For example, the determination engine 302 may send a message to execution engine 304 to notify the limitation of the driving options for the vehicle only at certain locations or certain driving actions (e.g. when the vehicle is about to make a turn, when the vehicle is about to change lanes)

In some embodiments, after the sensor system 106 determines a probability of the sensor being uncalibrated or broken, the determination engine 302 further selects an error handling method based on the probability of the sensor being uncalibrated or broken. For example, if the probability of the sensor being broken is below a threshold (e.g. a sixth threshold), the determination engine 302 may determine that the error handling method is to conduct recalibration of the sensor, issuing an alert to a user, or both of the above, without notifying the execution engine 304 to limit a range of motion of the vehicle. If the probability of the sensor being broken is above a threshold (e.g. a sixth threshold), the determination engine 302 may alert the execution engine 304 to instruct a limited range of motion of the vehicle.

In some embodiments, the determination engine 302 may be configured to determine whether to initiate shut down of the vehicle, such as an AV, if recalibration attempts are unsuccessful (e.g., the sensor is not validated after recalibration), or no other driving options for the vehicle without using the broken sensor. In some embodiments, the determination engine 302 may be configured to determine whether to retry recalibration or attempt a different error handling method. In some embodiments, the determination engine 302 may be configured to determine whether to instruct a limited range of motion of the vehicle based on an amount or degree of sensor error before the recalibrating (e.g. determined or measured by the sensor system 106), an amount or degree of sensor error after the recalibrating (e.g. determined or measured by the sensor system 106), or a difference between the amount or degree of sensor error before the recalibrating and the amount or degree of sensor error after the recalibrating. For example, if the amount or degree of sensor error after the recalibrating decreased compared to the amount or degree of sensor error before the recalibrating, the recalibrating may have been successful even if it did not completely calibrate the sensor. Thus, the determination engine 302 may determine to try recalibration. In some embodiments, the determination engine 302 may be configured to determine whether to perform a recalibration based on a probability that the sensor is uncalibrated before or after the recalibration, or a difference between the probability that the sensor is uncalibrated after recalibration compared to before recalibration. In other embodiments, the determination engine 302 may determine whether to retry recalibration based on a load consumption, an amount of availability of a system load, a history of the sensor, an availability of a backup sensor, a density of moving objects detected at a current location, a weather condition at the current location, or an environment condition at the current location.

The execution engine 304 may be configured to perform the specific error handling methods as determined by the determination engine 302. In some embodiments, the execution engine 304 may be configured to recalibrate the sensor. For example, the execution engine 304 may be configured to recalibrate the sensor based on a landmark. For example, the execution engine 304 may be configured to eliminate data determined to be erroneous and recalibrate the sensor. As another example, the execution engine 304 may be configured to eliminate only data determined to be erroneous while retaining the correct data before recalibration. If only a portion of an image is determined to be erroneous, the execution engine 304 may eliminate only the portion determined to be erroneous while retaining the remainder of the image. In some embodiments, the execution engine 304 may be configured to initiate a backup sensor to operate, for example, until the uncalibrated sensor is successfully recalibrated. In some embodiments, the execution engine 304 may be configured to instruct the vehicle to perform a limited driving options if the sensor is determined to be broken, rather than recalibrating the sensor. In some embodiments, the execution engine 304 may be configured to initiate a backup sensor if a backup sensor is available and if the backup sensor is calibrated. In some embodiments, the execution engine 304 may be configured to issue an alert of an uncalibrated sensor, potentially uncalibrated sensor, or a broken sensor. In some embodiments, the execution engine 304 may be configured to shut down the vehicle such as an AV if the sensor is determined to be broken.

The error handling control engine 306 may function to control the determination engine 302 or the execution engine 304. More specifically, the error handling control engine 306 may function to control one or more components of the determination engine 302 or the execution engine 304.

The communication engine 308 may function to send requests, transmit and, receive communications, and/or otherwise provide communication with one or a plurality of systems. In some embodiments, the communication engine 308 functions to encrypt and decrypt communications. The communication engine 308 may function to send requests to and receive data from one or more systems through a network or a portion of a network. Depending upon implementation-specified considerations, the sensor communication engine 308 may send requests and receive data through a connection, all or a portion of which may be a wireless connection. The sensor communication engine 308 may request and receive messages, and/or other communications from associated systems.

Figure 4:
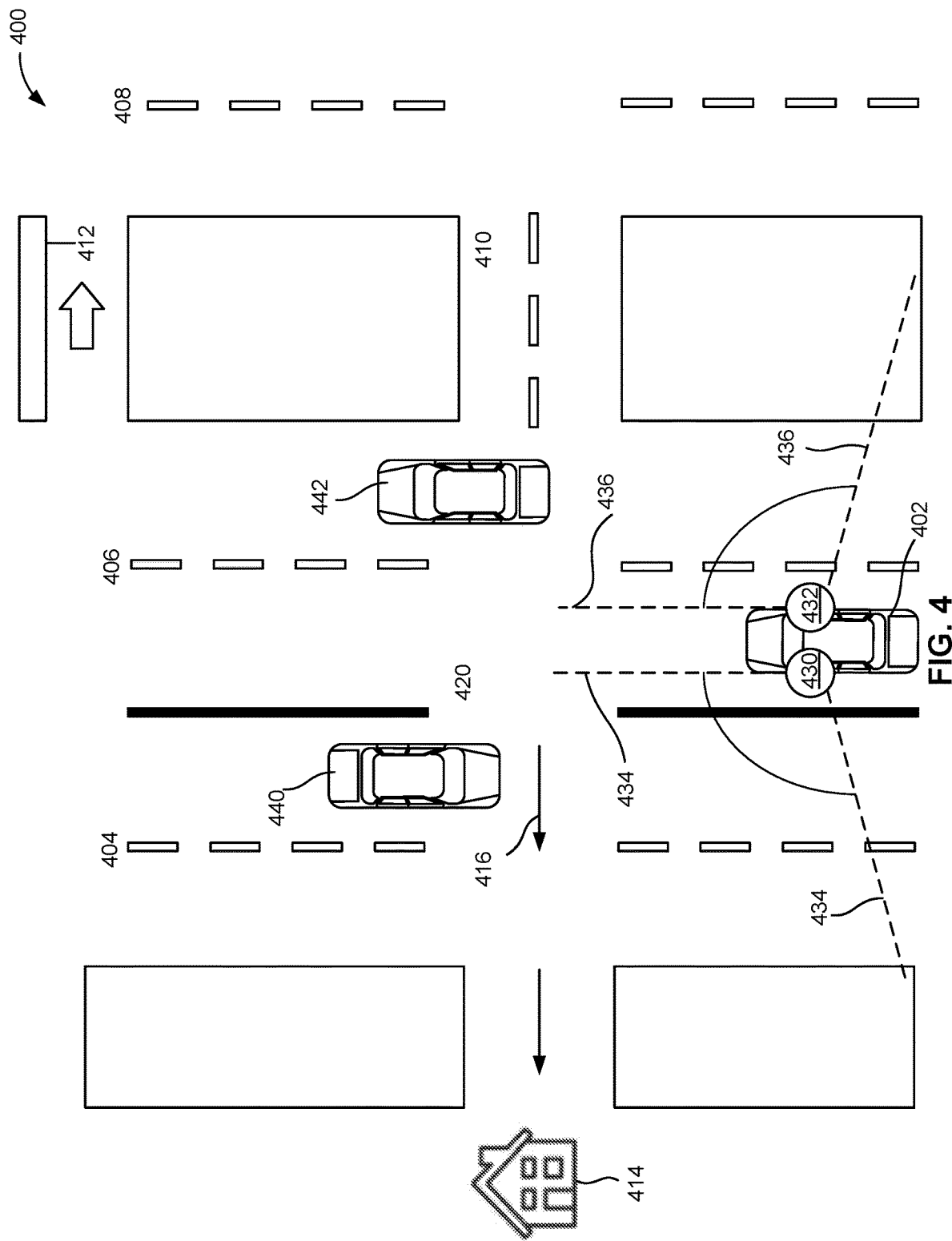
FIG. 4 depicts an example scenario for providing driving actions to a vehicle based on the sensor damage detector and the error handling system provided by the vehicle system, in accordance with some embodiments.

FIG. 4 illustrates an example scenario for providing safe driving action of a vehicle in response to vehicle sensors, in accordance with some embodiments. The scenario may include an environment including roads 404, 406, 408, 410, 412. The roads 404, 406, 408, 410 may individually include two or more lanes. The traffic on the road 406 and the roads 404, 408 may be travelling in opposite directions. The roads 410, 412 may include one-way road. The roads 404, 406 and the road 410 may intersect at an traffic intersection 420. A building (e.g. a house) 414 may be located at the end of the road 410. A vehicle 402 may be on the left side of the road 406 approaching to the traffic intersection 420. The vehicle 402 may be driving on a route 416 ready to make a left turn to the building 414. One or more vehicle sensors may be mounted on the vehicle 402. In some embodiments, the vehicle sensors may be mounted on the difference locations of the vehicle 402. In some embodiments, one of more vehicle sensors may cover different detection area surrounding the vehicle 402. In some embodiments, one of the vehicle sensors 430 may be located at the left side of the vehicle 402 (e.g. left side sensor). In some embodiments, one of the vehicle sensors 432 may be located at the right side of the vehicle 402 (e.g. right side sensor). In some embodiments, the left side sensor 430 and the right side sensor 432 may have different coverage of detection. For example, the left side sensor 430 may have coverage area nearby the left side of the vehicle 402 (covering an area 434), and the right side sensor 432 may coverage area nearby the right side of the vehicle 402 (covering an area 436). The sensors 430, 432 of the vehicles may be of a same type and/or different types. The capabilities of two or more of the sensors of the vehicles 430, 432 may be the same and/or different. Other capabilities of sensors are contemplated.

Different vehicle sensor data may be generated based on sensors of the vehicle 402. Different sensor data may characterize positions of objects within the environment of the different sensors. Different sensor data may be generated based on the sensors of different types, the sensors having different capabilities, the different positioning of the sensors within the environment, and/or other sensor data. Different sensor data generated based on the sensors of the vehicle 402 may be gathered together.

Integrated data for an optimized navigation of a vehicle 402 may be determined based on the gathered sensor data of different sensors on the vehicle 402. For example, the left side sensor 430 may detect the objects such as a vehicle 440 and road 404 within a field of view 434. The left side sensor 430 may determine the value of the one or more parameters of the objects with respect to the vehicle 402. As another example, the right side sensor 432 may detect the objects such as a vehicle 442 and road 406, 410 within a field of view 436. The right side sensor 432 may determine the value of the one or more parameters of the objects with respect to the vehicle 402. The movement of the vehicles 402, 440, 442 may also be taken into account when determining the integrated data. The integrated data for the vehicle 402 may characterize and/or analyze positions of objects nearby the vehicle 402. The optimized navigation of the vehicle 402 may be determined based on the integrated data, and one or more instructions may be provided to the vehicle 402 based on the optimized navigation of the vehicle 402. For example, the left side sensor 430 may detect the action of a vehicle 440 driving on the road 406 near the traffic intersection 420. The vehicle 402 that is going to make a turn to the building 414, may, based on such data provided by the left side sensor 430, alert the vehicle 402 to stop when approaching the traffic intersection 420.

In some embodiments, different sensor data may be generated based on the sensors of different sides 430, 432. Different sensor data may characterize positions of objects within the environment of the different sensors. For example, sensor data generated based on the left side sensor 430 may characterize the movement of objects (e.g. vehicles, buildings, pedestrians, road conditions) based on the object within a field of view 434 of the sensor 430. Sensor data generated based on the left sensor may not characterize the movement of the objects based on the objects outside the field of view 434 of the sensor 432. As another example, sensor data generated based on the right side sensor 432 may characterize the movement of objects (e.g. vehicles, buildings, pedestrian, road conditions) based on the object within a field of view 436 of the sensor 432. Sensor data generated based on the right sensor may not characterize the movement of the objects based on the objects outside the field of view 436 of the sensor 432. Therefore, different sensor data may provide data on positions of objects and/or lack of objects in different parts of the environment shown in the scenario 400.

Figure 5:
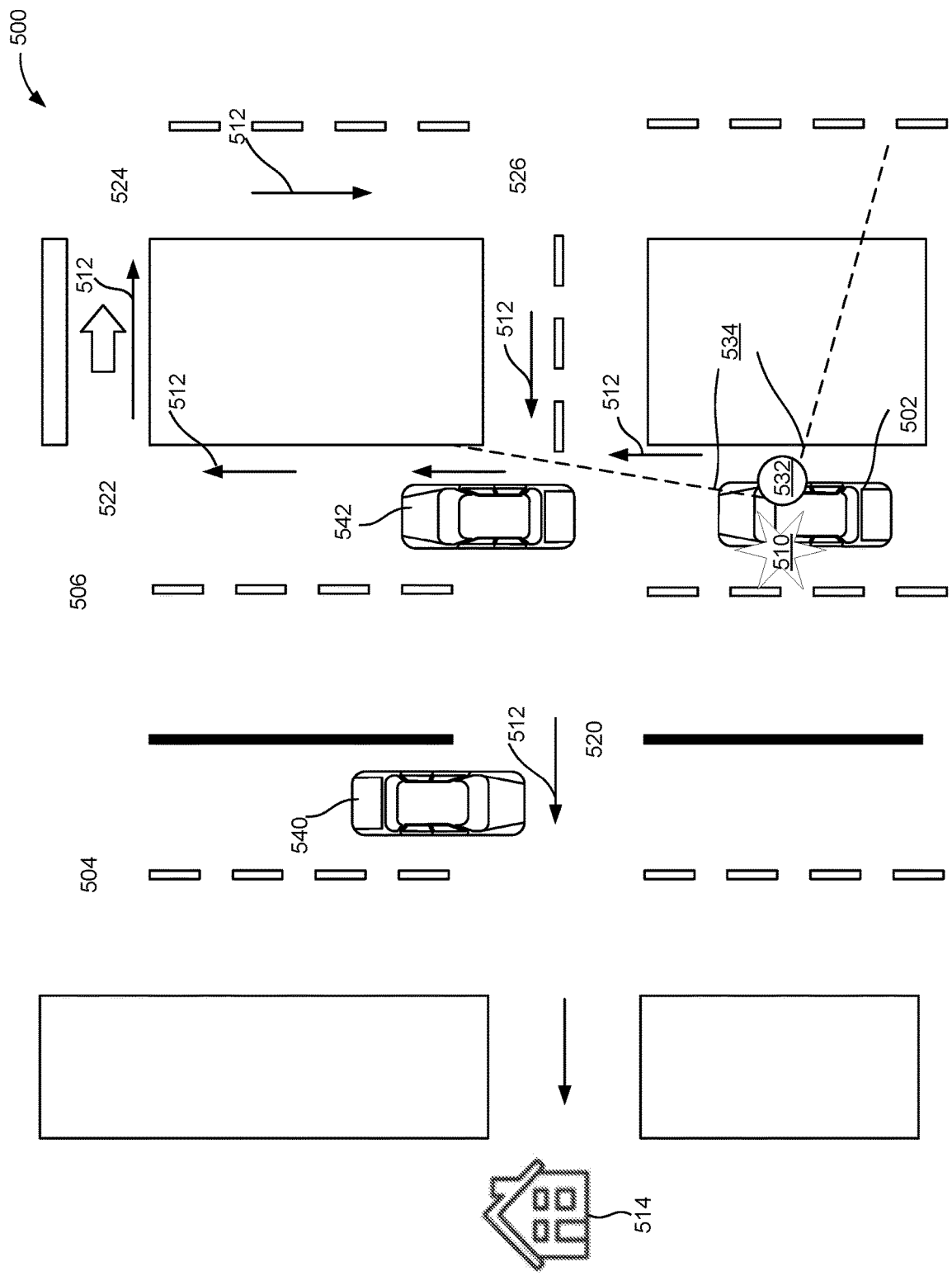
FIG. 5 depicts an example scenario for providing driving actions to a vehicle based on the sensor damage detector and the error handling system provided by the vehicle system, in accordance with some embodiments.

FIG. 5 is an example scenario illustrating safe vehicle navigation when one of the sensors, particularly a side sensor, is broken or uncalibrated, in accordance with some embodiments. The scenario may include a vehicle 502 having a broken or uncalibrated left side sensor 510. In some embodiments, different sensor data may be generated based on sensors on different locations of the vehicle, and may characterize positions of objects surrounding the vehicle. In some embodiments, when one of the sensors, particularly side sensors, is determined to be broken or uncalibrated at a first side, the vehicle may be instructed to limit a range of motion of the vehicle and restrict the vehicle from turning in a direction of the first side. For example, as shown in FIG. 5, when the left side sensor 510 is broken or uncalibrated, the left side sensor 510 may not be able to capture data within the field of view surrounding the left side of the vehicle 502. In some embodiments, the vehicle 502 may be alerted about the broken or uncalibrated status of the left side sensor 510, and may change driving routes based on the alert from the sensor system (e.g., sensor system 106).

In some embodiments, the driving action of the vehicle may be different based on data captured from broken sensors and working sensors on the vehicle. For example, as shown in FIG. 4, when the sensors works on both sides 430, 432, the vehicle on the road 406 may be able to stay in an original driving route 416, and directly make a left turn at the traffic intersection 420 to arrive at the destination 414. FIG. 5 illustrates a scenario example in which the left side sensor 510 is broken and no data can be captured from the left side sensor 510, and the vehicle 502 is instructed to take an alternative driving route 512 to reach the destination 514. For example, as shown in FIG. 5, the left side sensor 510 of the vehicle 502 is broken or uncalibrated at the left side of the vehicle 502. For example, the right side sensor 532 may detect objects such as a vehicle 542 and road 506 within a field of view 534. For example, the right side sensor 532 may not be able to detect a vehicle 540. The sensor damage detection system (e.g., sensor damage detection system 108) may detect a broken or uncalibrated status of the left side sensor 510, and instruct an error handling system (e.g., 112) to limit a range of motion of the vehicle when driving. For example, the vehicle 502 in FIG. 5, may not be able to capture any data from the left side, and may restrict the vehicle 502 from making a left turn. In such situation, the vehicle 502 may have to change a driving route in order to reach the destination building 514. The vehicle 502 may be provided with limited driving options to reach the building 514 based on data captured from other working sensors on the vehicle (e.g., 532). One of the driving options may be allowing the vehicle to only make a turn to the right side. For example, as shown in FIG. 5, when the sensor damage detection system 108 determines that the left side sensor 510 is broken or uncalibrated and no data can be captured at the left side, the vehicle 502 may be instructed to take the alternative driving route 512 to reach the building 514. In the driving route 512, the vehicle 502 may drive on the road 506, and only turn in a direction of the right side (e.g., making a right turn at intersections 522, 524, and 526 while following the route 512) before reaching the destination building 514. In such case, the vehicle 502 may only need the sensor from the right side 532 because the right side sensor 532 may be able to capture data from the field of view 534 of the sensor 532. Planning an alternative route may occur before the vehicle 502 begins driving. For example, the vehicle system 100 (e.g., the error handling system 112 of the vehicle system 100) may plan a route to a destination without using roads that require left turns, and/or sharp left turns that are beyond a permitted radius of curvature, as determined based on a level or severity of damage of the broken left sensor 510. As another example, if no alternative route is possible, the vehicle 502 may pull over to a side of the road and shut down.

As another example, the sensor damage detection system 108 may determine an extent or severity of damage of the broken left side sensor 510. Based on the severity or extent of the damage of the broken left side sensor 510, the vehicle 502 may be permitted to perform limited functions to a direction on the left. For example, if the broken left side sensor 510 is only partially and not entirely damaged, the vehicle 502 may be permitted (e.g., by the error handling system 112) to make a lane change to the left, and/or may be permitted to make left turns up to a certain angle or radius of curvature (e.g., the vehicle 502 may be restricted from making a full 90 degree left turn but may be allowed to make left turns of up to 45 degrees).

In some embodiments, the error handling system 112 of the vehicle 502 may also determine driving actions in response to the environment (e.g., speed of the vehicle, traffic density, road conditions or weather conditions). For example, the error handling system 112 of the vehicle 502 may determine whether or not, and/or to what extent, to restrict a motion of the vehicle 502 with a broken sensor 510, based on a density of other objects (e.g., pedestrians, buildings, vehicles) on or in the vicinity of the road. For example, if the density of other objects is low (e.g., below a threshold), the error handling system 112 may allow the vehicle 502 to turn in a direction corresponding to a side with the broken sensor 510. As another example, if the density of other objects is low (e.g., below a threshold), the error handling system 112 may reduce a restriction on how much the vehicle 502 is allowed to turn. For example, if the density of other objects is below a threshold, the vehicle 502 may still be permitted to make left turns of up to 60 degrees, but if the density of other objects is above the threshold, the vehicle 502 may only be permitted to make left turns of up to 30 degrees. In other embodiments, the extent (degrees or radius of curvature) of a left turn allowed may be inversely proportional, or inversely correlated with, the density of other objects. In other embodiments, the error handling system 112 may limit a speed of the vehicle 502 when making the turn.

As another example, in order to obtain data missing as a result of the broken left sensor 510, the vehicle 502 may attempt to obtain the missing data from another vehicle on the road such as the vehicle 540 or the vehicle 542, if the vehicle 540 or the vehicle 542 has an operational left side sensor. In one example, because the vehicle 502 would only be able to detect vehicle 542, the vehicle 502 would attempt to obtain the missing data (of the left side) from the vehicle 542. As another example, the vehicle 502 may attempt to obtain the missing data from publicly available sensors such as cameras. After obtaining the missing data, the vehicle 502 may utilize the data in order to make a left turn.

Figure 6:
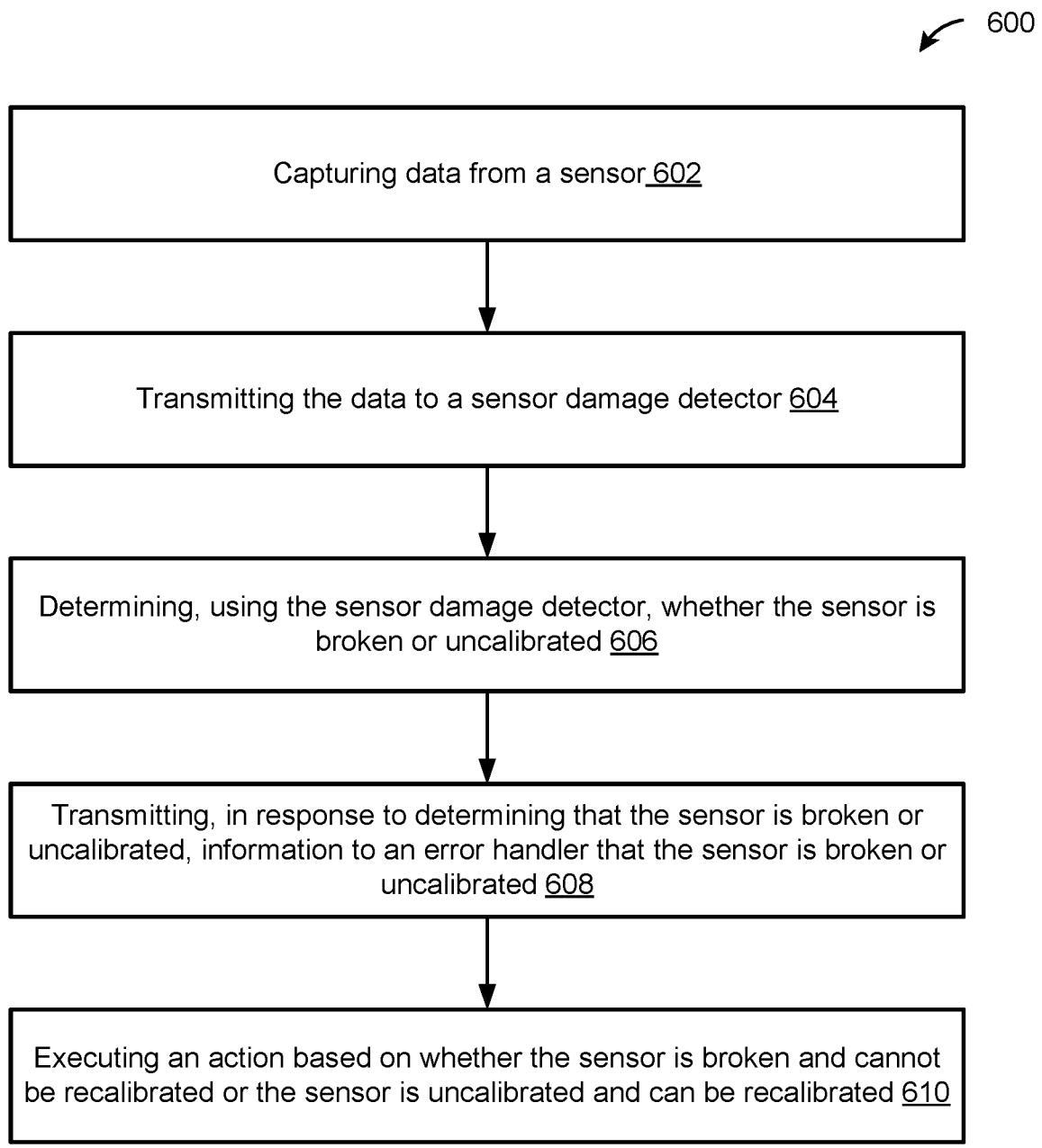
FIG. 6 depicts a flowchart of an example of an example method, in accordance with some embodiments.

FIG. 6 illustrates a flowchart 600 of an example of a method of determining a safe driving action of a vehicle and providing safety navigation of a vehicle based on sensor data captured from the vehicle, in accordance with some embodiments. In this and other flow flowcharts, the flowchart 600 illustrates by way of examples a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. is also applicable to FIG. 6. The example method 600 may be implemented in various computing systems or devices including one or more processors.

In step 602, a sensor system (e.g. sensor system 106) may capture data from a sensor, for example, a sensor mounted on a left side of a vehicle such as an AV. As used herein, sensors may include laser scanning systems (e.g., Lidar systems), radar systems, cameras, GPS, sonar, ultrasonic, IMU, and FIR (far infrared) sensors and/or the like. The data may be processed and analyzed to produce, for example, an image histogram of a graphical representation of tonal distribution in an image captured by the one or more sensors. The data may be processed and analyzed to determine or estimate a parameter. Such parameters may include information generated from a statistical analysis of the data. Such parameters may include an optical center, a focal length, a skew, a distortion, an image center, a depth of field, an angle of view, a beam angle, an aspect ratio, and a pixel number, a level of noise, and the like. Such parameters may include information of the sensor that may be compared with known parameters or parameters processed from historical data. Historical data may refer to, as an example, information obtained from an image or one or more specific features of the image at a specific location. Historical data may be information already verified by other images taken at a same location by other sensors and/or onboard 3D map data. The data may include an image captured from the sensor, or one or more specific features (such as trees, road, grass, landmarks, people, inanimate objects) extracted from the image.

In step 604, the data is transmitted to an analysis engine (e.g., 204) of a sensor damage detection system 108 (e.g. a sensor damage detector). The analysis engine 204 may determine whether a sensor is to be calibrated. The determining may be based on a result from a validation. The validation may comprise a comparison between the determined or estimated parameter from the data captured from the sensor with a known parameter of the sensor. The validation may be on the basis of the historical data. In some embodiments, the determining may be based on a result from a second validation. The second validation may comprise a comparison between the determined or estimated parameter from the data captured from the sensor with a second parameter of a second sensor.

The analysis engine 204 may adjust a frequency of the validation or the second validation based on a computation load requirement or consumption of the validation or the second validation, an amount of availability of a computation load of the sensor system 106, a history of the sensor, a density of moving objects detected, a weather condition, or an environment condition. For example, if a computation load requirement of the validation or the second validation is high, the analysis engine 204 may conduct the validation or the second validation less frequently. As another example, if there is not enough computation load available on the sensor system 104, the analysis engine may adjust the frequency of the validation or the second validation so that they are conducted less frequently. As another example, if the sensor is old or frequently requires calibration, the analysis engine 204 may conduct the validation or the second validation more frequently. As another example, if the density of moving objects (e.g., people, vehicles) detected is high, which signifies a higher danger, the analysis engine 204 may conduct the validation or the second validation more frequently. As another example, if the weather conditions are rainy or snowy, signifying a higher danger, the analysis engine 204 may conduct the validation or the second validation more frequently. As another example, if the environment conditions are foggy, hazy, or polluted, signifying a higher danger, the analysis engine 204 may conduct the validation or the second validation more frequently.

The analysis engine 204 may adjust the frequency of the validation or the second validation based on at least one of, or any combination of, the computation load requirement of the validation or the second validation, the amount of availability of a computation load of the sensor system 104, the history of the sensor, the density of moving objects detected, a weather condition, and an environment condition. For example, the analysis engine 204 may adjust the frequency of the validation and the frequency of the second validation based on the same factors, or based on different factors. For example, the analysis engine 204 may adjust the frequency of the validation based on the history of the sensor and based on the computation load requirement of the validation. For example, the analysis engine 204 may adjust the frequency of the validation based on the history of the sensor and based on the computation load requirement of the validation, while adjusting the frequency of the second validation based on the density of moving objects detected, the weather condition, or the environment condition.

In some embodiments, if a computation load requirement or consumption of the validation or the second validation is high, or if the sensor cannot be recalibrated and data cannot be validated, the analysis engine 204 may immediately notify an error handling system to limit driving options for the vehicle. For example, if the density of moving objects surrounding a broken or uncalibrated sensor is high, which signifies a higher danger, the analysis engine 204 may immediately notify the error handling system to restrict the vehicle from using the broken sensor or may immediately shut down the vehicle. As another example, if the weather conditions are rainy or snowy, signifying a higher danger, the analysis engine 204 may immediately notify the error handling system to restrict the vehicle from using the broken sensor or may immediately shut down the vehicle.

In step 606, the sensor damage detection system 108 may determine whether the sensor is broken or uncalibrated. In step 608, in response to determining that the sensor is broken or uncalibrated, the sensor damage sensor system may transmit information to an error handling system that one or more sensors is broken or uncalibrated.

In step 610, the error handling system (e.g. 112) may execute different actions based on the status of the sensor. The error handling system may recalibrate the sensor if the sensor is determined to be uncalibrated and can be recalibrated. The error handling system may limit a range of motion of the vehicle if the sensor is determined to be broken and cannot be recalibrated.

Figure 7:
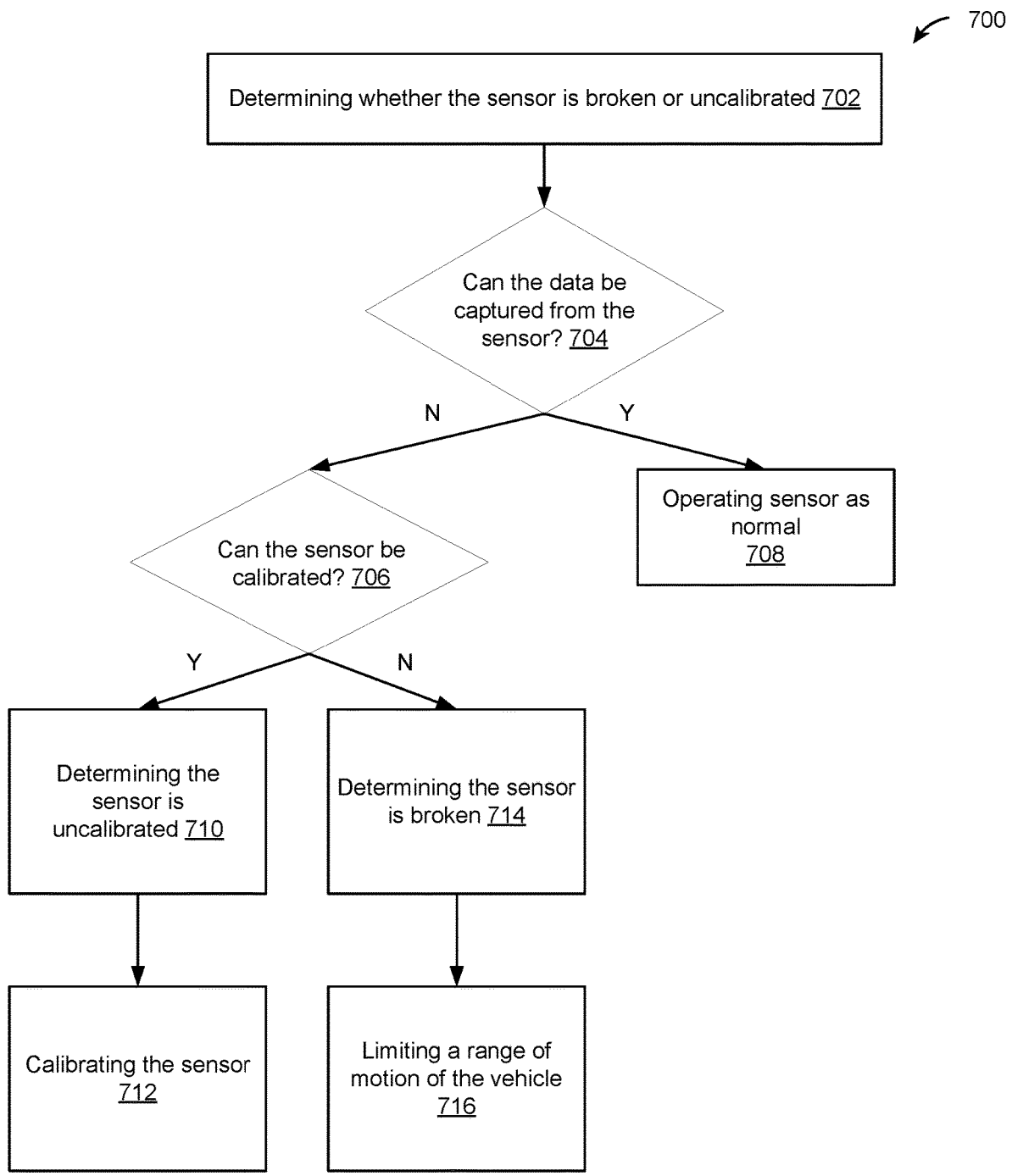
FIG. 7 depicts a flowchart of an example of an example method, in accordance with some embodiments.

FIG. 7 illustrates a flowchart of an example of an error handling method of a sensor in a vehicle such as an AV.

In step 702, a sensor system (e.g., sensor system 106) may determine whether the sensor is uncalibrated, similar to step 606 as described above in FIG. 6. In decision 704, an sensor damage detection system (e.g., sensor damage detection system 108) may determine whether the data can be captured from the sensor. In step 708, if the sensor damage decision system determines that the sensor data can be captured from the sensor, the sensor is operated as normal. In decision 706, if the data cannot be captured from the sensor, the sensor damage detection system may determine whether the sensor can be recalibrated. In step 710, if the sensor damage detection system determined that the sensor can be recalibrated, the sensor damage detection system 108 determines that the sensor is uncalibrated (rather than broken). In step 712, the sensor may be calibrated by an error handling system (e.g., error handling system 112). In some embodiments, in step 714, if the sensor damage detection system 108 determines that the sensor cannot be calibrated, the sensor damage detection system 108 determines that the sensor is broken. In step 716, the error handling system may limit a range of motion of the vehicle to provide a limited number of driving options for the vehicle.

In some embodiments, in step 706, if the sensor is determined to be calibrated, the error handling system (e.g., 106) may calibrate the first sensor. In some embodiments, the error handling system 106 may eliminate data from the sensor requiring calibration. In some embodiments, the error handling system 106 may eliminate only data determined to be erroneous while retaining the correct data. In some embodiments, the error handling system 106 may recalibrate the sensor based on a landmark. In some embodiments, the error handling system 106 may issue an alert of an uncalibrated sensor. In some embodiments, the error handling system 106 may perform any combination of the aforementioned tasks. In some embodiments, the error handling system 106 may initiate shut down of the vehicle if recalibration attempts are unsuccessful.

Figure 8:
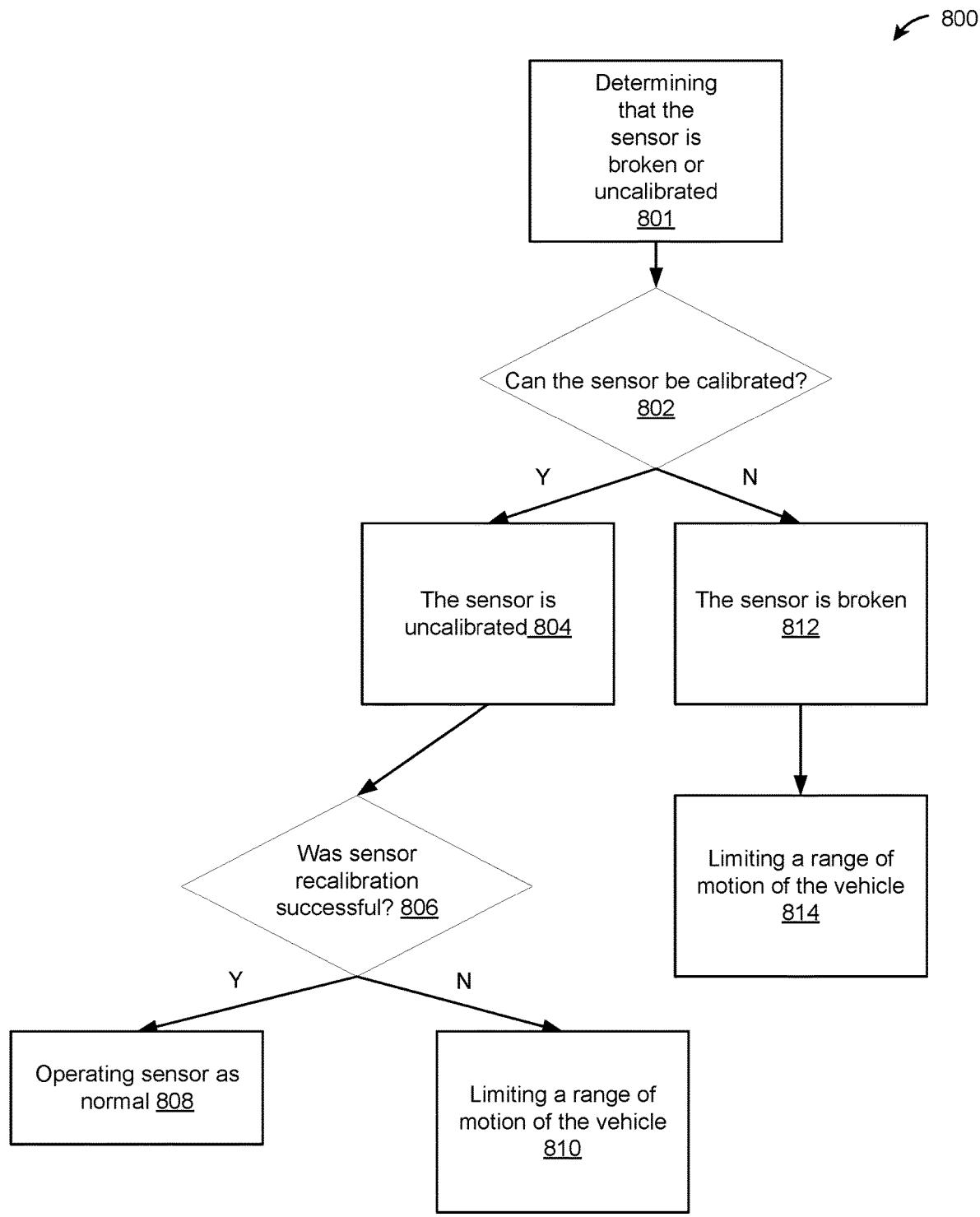
FIG. 8 depicts a flowchart of an example of an example method, in accordance with some embodiments.

FIG. 8 illustrates a flowchart of an example an error handling method of a sensor in a vehicle such as an AV. In step 801, a sensor damage detection system (e.g., sensor damage detection system 108) may determine that a sensor is broken or uncalibrated (for example, if sensor readings are determined to be erroneous). In decision 802, a sensor damage detection system determines whether the sensor can be calibrated, similar to decision 706 as described above in FIG. 7. In step 804, if the sensor is determined to be uncalibrated but can be recalibrated, an error handling system may determine whether the sensor recalibration is successful in decision 806. In step 808, if the sensor recalibration is successful, the sensor may be operated as normal. In step 810, if the sensor is determined to be broken, as a result of unsuccessful attempt at recalibration, the error handling system may limit a range of motion of the vehicle (e.g., limiting a number of driving options for the vehicle). In step 812, if the sensor cannot be calibrated, the sensor is determined to be broken. In step 814, the error handling system may immediately limit a range of motion of the vehicle in step 808.

In some embodiments, in step 804, the error handling system may determine whether the sensor requires immediate calibration or should be immediately recalibrated, for example, based on whether road conditions (e.g., traffic environment) are especially dangerous. In decision 806, after recalibration is performed, an analysis engine (e.g., analysis engine of sensor system) may determine whether the sensor is validated after the recalibration attempt.

Computer Vision, Machine Learning, and Neural Network

Computer Vision. One or more computer vision algorithms can be implemented for determining driving actions. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth. One or more of these computer vision algorithms can be used in trajectory prediction described herein, e.g., to determine the trajectory of a vehicle with respect to an object.

Machine Learning. Trajectory prediction can additionally or alternatively be performed by a variety of machine learning algorithms. Once trained, the machine learning algorithm can be stored in a computing system. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. One or more of the machine learning algorithms can be used in trajectory prediction described herein, e.g., to determine the trajectory of a vehicle with respect to an object.

Neural Network. A layer of a neural network (NN), such as a deep neural network (DNN) can apply a linear or non-linear transformation to its input to generate its output. A neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, $(x/(1+|x|))$. The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if $x \geq 0$ and ax if $x \leq 0$, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. A processor can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs Hardware Implementation The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
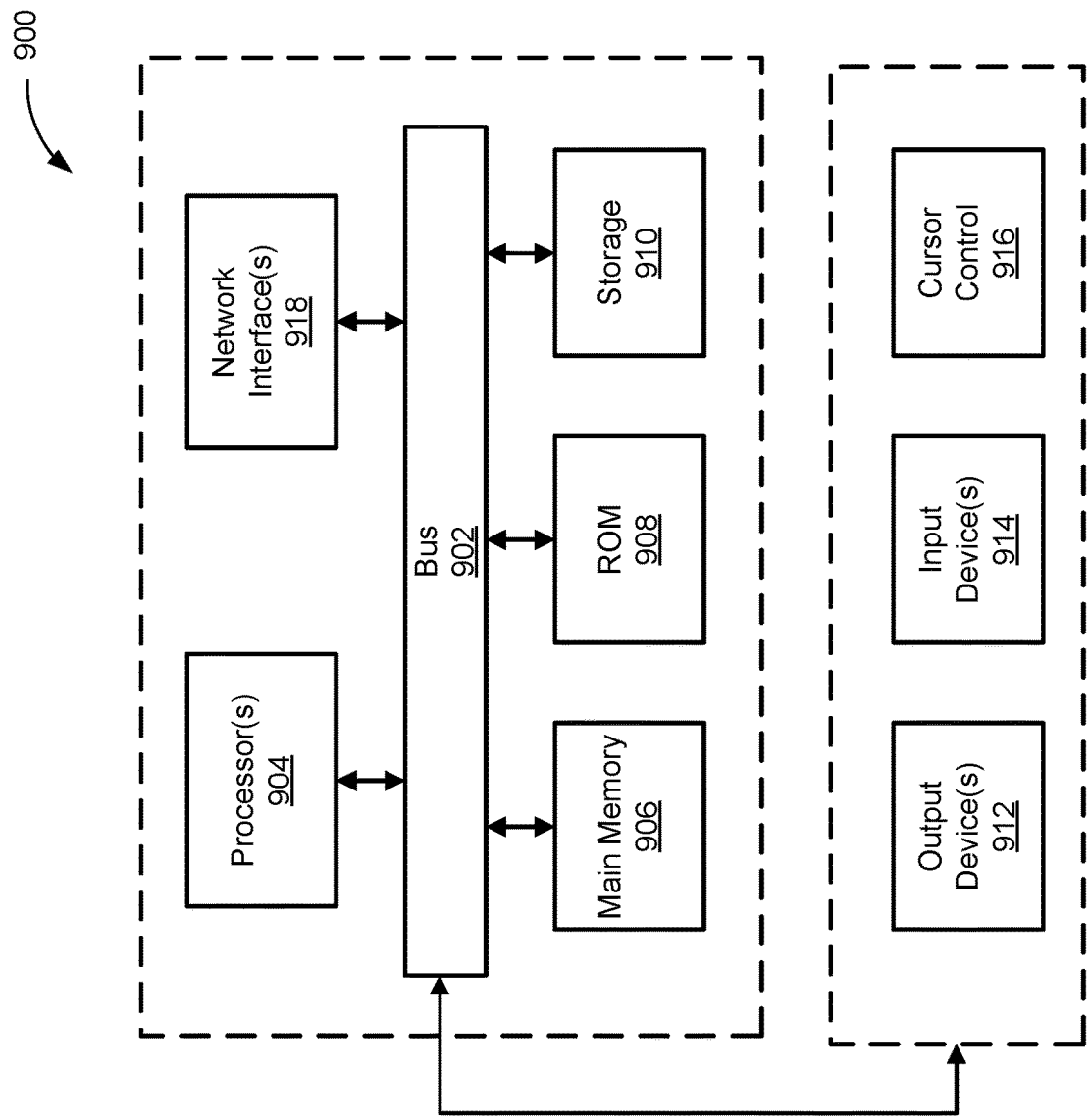
FIG. 9 depicts a diagram of an example computer system for implementing the features disclosed herein

FIG. 9 is a block diagram that illustrates a computer system 900 upon which any of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to output device(s) 912, such as a cathode ray tube (CRT) or LCD display (or touch screen), for displaying information to a computer user. Input device(s) 914, including alphanumeric and other keys, are coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieves and executes the instructions. The instructions received by main memory 906 may optionally be stored on storage device 910 either before or after execution by processor 904.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors)

may be configured by software (e.g., an application or application portion) as a hardware engine that operates to perform certain operations as described herein.

The vehicle system 100 as described may be configured to perform the aforementioned tasks using a different organization or configuration of systems and/or engines. For example, some or all of the separate systems and/or engines described previously may be combined into a single system and/or engine, or further separated into distinct systems and/or engines.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A vehicle system implemented on a vehicle, comprising:
   a sensor configured to capture data;
   one or more processors; and
   a non-transitory memory storing instructions that, when executed by the one or more processors, cause the system to perform:
   determining whether the sensor is broken or uncalibrated, based on the data;
   in response to determining that the sensor is broken:
   determining a density of objects surrounding the vehicle;
   based on the density of objects surrounding the vehicle:
   determining whether to limit a range of motion of the vehicle or to restrict a speed of the vehicle while turning in a direction corresponding to a side of the broken sensor, wherein the limitation on the range of motion comprises a restriction on a number of degrees which the vehicle is permitted to move in the direction corresponding to the side of the broken sensor; and limiting the range of motion or restricting the speed of the vehicle according to the determination of whether to limit the range of motion of the vehicle or to restrict the speed of the vehicle.

2. The system of claim 1, wherein the determination that the sensor is broken is in response to an unsuccessful recalibration attempt on the sensor.

3. The system of claim 1, wherein the instructions further cause the system to perform:

determining a frequency at which to validate whether the sensor is broken or uncalibrated, based on the data, and based on a density of moving objects in a location neighboring the sensor.

4. The system of claim 1, wherein the determining of the frequency at which to validate whether the sensor is broken or uncalibrated is based on a computation load consumed by the validation.

5. The system of claim 1, wherein the determining of the frequency at which to validate whether the sensor is broken or uncalibrated is based on a historical frequency at which the sensor has been calibrated.

6. The system of claim 1, wherein the determining whether to limit a range of motion of the vehicle or to restrict a speed of the vehicle comprises:

determining whether the density of objects exceeds a threshold density; and in response to the density of objects exceeding the threshold density, determining to limit the range of motion of the vehicle.

7. The system of claim 6, wherein the determining whether to limit a range of motion of the vehicle or to restrict a speed of the vehicle comprises:

in response to the density of objects being less than the threshold density, determining to restrict the speed of the vehicle.

8. The system of claim 1, wherein the instructions further cause the system to perform:

in response to determining to limit the range of motion of the vehicle, planning an alternative route to a destination that is devoid of turns that exceed the number of degrees in the direction corresponding to the side of the broken sensor.

9. The system of claim 1, wherein the instructions further cause the system to perform:

in response to determining to limit the range of motion of the vehicle, determining the limitation on the range of motion based on an extent or a severity of damage to the broken sensor.

10. The system of claim 1, wherein the instructions further cause the system to perform:

permitting a lane change in the direction corresponding to the side of the broken sensor.

11. A method comprising:

capturing data using a sensor;

determining whether the sensor is broken or uncalibrated, based on the data;

in response to determining that the sensor is broken:

determining a density of objects surrounding the vehicle;

based on the density of objects surrounding the vehicle:

determining whether to limit a range of motion of the vehicle or to restrict a speed of the vehicle while turning in a direction corresponding to a side of the broken sensor, wherein the limitation on the range of motion comprises a restriction on a number of degrees which the vehicle is permitted to move in the direction corresponding to the side of the broken sensor; and limiting the range of motion or restricting the speed of the vehicle according to the determination of whether to limit the range of motion of the vehicle or to restrict the speed of the vehicle.

12. The method of claim 11, wherein the determination that the sensor is broken is in response to an unsuccessful recalibration attempt on the sensor.

13. The method of claim 11, further comprising:

determining a frequency at which to validate whether the sensor is broken or uncalibrated, based on the data, and based on a density of moving objects in a location neighboring the sensor.

14. The method of claim 11, wherein the determining of the frequency at which to validate whether the sensor is broken or uncalibrated is based on a computation load consumed by the validation.

15. The method of claim 11, wherein the determining of the frequency at which to validate whether the sensor is broken or uncalibrated is based on a historical frequency at which the sensor has been calibrated.

16. The method of claim 11, wherein the determining whether to limit a range of motion of the vehicle or to restrict a speed of the vehicle comprises:

determining whether the density of objects exceeds a threshold density; and in response to the density of objects exceeding the threshold density, determining to limit the range of motion of the vehicle.

17. The method of claim 16, wherein the determining whether to limit a range of motion of the vehicle or to restrict a speed of the vehicle comprises:

in response to the density of objects being less than the threshold density, determining to restrict the speed of the vehicle.

18. The method of claim 11, further comprising:

in response to determining to limit the range of motion of the vehicle, planning an alternative route to a destination that is devoid of turns that exceed the number of degrees in the direction corresponding to the side of the broken sensor.

19. The method of claim 11, further comprising:

in response to determining to limit the range of motion of the vehicle, determining the limitation on the range of motion based on an extent or a severity of damage to the broken sensor.

20. The method of claim 11, further comprising:

permitting a lane change in the direction corresponding to the side of the broken sensor.

* * * * *